(12) United States Patent
Leshuk et al.

(10) Patent No.: US 11,713,256 B2
(45) Date of Patent: Aug. 1, 2023

(54) COMPOSITE MATERIAL FOR WATER TREATMENT

(71) Applicant: H2nanO Inc., Waterloo (CA)

(72) Inventors: Timothy Michael Carter Leshuk, Waterloo (CA); Zachary William Young, Stoney Creek (CA); Frank Gu, Toronto (CA)

(73) Assignee: H2nanO Inc., Kitchener (CA)

( * ) Notice: Subject to any disclaimer, the term of this patent is extended or adjusted under 35 U.S.C. 154(b) by 783 days.

(21) Appl. No.: 16/343,298

(22) PCT Filed: Oct. 19, 2017

(86) PCT No.: PCT/IB2017/056505
§ 371 (c)(1),
(2) Date: Apr. 18, 2019

(87) PCT Pub. No.: WO2018/073782
PCT Pub. Date: Apr. 26, 2018

(65) Prior Publication Data
US 2019/0256376 A1     Aug. 22, 2019

Related U.S. Application Data

(60) Provisional application No. 62/410,006, filed on Oct. 19, 2016.

(51) Int. Cl.
*C02F 1/28* (2023.01)
*B01J 20/06* (2006.01)
(Continued)

(52) U.S. Cl.
CPC ............... *C02F 1/288* (2013.01); *B01J 20/06* (2013.01); *B01J 20/103* (2013.01); *B01J 20/20* (2013.01);
(Continued)

(58) Field of Classification Search
CPC ......... H01L 21/02587; H01L 21/02595; H01L 21/02598–02606; H01L 2224/05111;
(Continued)

(56) References Cited

U.S. PATENT DOCUMENTS 5,866,006 A     2/1999 Lihme et al.
2002/0162798 A1* 11/2002 Johnson .................... H01F 1/36
                                                    210/660

(Continued)

FOREIGN PATENT DOCUMENTS

CA        2843513 A1    11/2012
EP        0978311 A1     2/2000
JP     2014039919 A      3/2014

OTHER PUBLICATIONS

Kim et al. (J. Am. Chem. Soc., 2006, 128, 688-689 and supporting info). (Year: 2006).*

(Continued)

*Primary Examiner* — Clare M Perrin
(74) *Attorney, Agent, or Firm* — Own Innovation; James W. Hinton

(57) ABSTRACT

A composite material for use in water treatment. The composite material includes a porous matrix including a resin capable of retaining a catalyst and magnetic material therein, and includes a density regulating portion disposed therein. The catalyst is capable of facilitating a chemical reaction involving a contaminants in the water. The magnetic material and density regulating portion can be used to separate the composite material from treated water. Systems and methods of use involving passive water treatment, continuous water treatment, solar light exposure, UV light exposure, and electrochemical cells, employing photochemical, electrochemical, and photoelectrochemical reactions are described. Methods of manufacture are described.

26 Claims, 20 Drawing Sheets

(51) Int. Cl.
- *B01J 20/10* (2006.01)
- *B01J 20/20* (2006.01)
- *B01J 20/28* (2006.01)
- *B01J 20/34* (2006.01)
- *B01J 37/02* (2006.01)
- *C02F 1/32* (2023.01)
- *C02F 1/72* (2023.01)
- *C02F 1/00* (2023.01)
- *C02F 1/44* (2023.01)
- *C02F 1/467* (2023.01)
- *C02F 1/52* (2023.01)
- *C02F 103/00* (2006.01)
- *C02F 1/48* (2023.01)

(52) U.S. Cl.
CPC ..... *B01J 20/2803* (2013.01); *B01J 20/28009* (2013.01); *B01J 20/28026* (2013.01); *B01J 20/28035* (2013.01); *B01J 20/3433* (2013.01); *B01J 20/3441* (2013.01); *B01J 20/3475* (2013.01); *B01J 37/0215* (2013.01); *C02F 1/32* (2013.01); *C02F 1/725* (2013.01); *C02F 1/001* (2013.01); *C02F 1/281* (2013.01); *C02F 1/283* (2013.01); *C02F 1/44* (2013.01); *C02F 1/4672* (2013.01); *C02F 1/488* (2013.01); *C02F 1/52* (2013.01); *C02F 2103/007* (2013.01); *C02F 2303/16* (2013.01); *C02F 2303/18* (2013.01); *C02F 2305/08* (2013.01); *C02F 2305/10* (2013.01); *Y02A 20/212* (2018.01)

(58) Field of Classification Search
CPC . H01L 2224/05118; H01L 2224/05166; H01L 2224/05184
See application file for complete search history.

(56) References Cited

U.S. PATENT DOCUMENTS

2002/0187082 A1   12/2002  Wu et al.
2014/0131288 A1*  5/2014   Gu ................... B01J 21/063
                                              427/127

OTHER PUBLICATIONS

Bonnefond et al. (Journal of Polymer Science, Part A: Polymer Chemistry, 2016, 54, 3350-3356). (Year: 2016).*
Sathe et al. (Anal. Chem., 2006, 78, 5627-5632). (Year: 2006).*
Dhawan et al. (Synthetic Metals, 2009, 159, 2259-2262). (Year: 2009).*
ISA/CA, International Search Report and Written Opinion, dated Feb. 9, 2018, re PCT International Patent Application No. PCT/IB2017/056505.
ISA/CA, International Preliminary Report on Patentability, dated May 2, 2019, re PCT International Patent Application No. PCT/IB2017/056505.
PCT/IB2017/056505, Composite Material for Water Treatment, Oct. 19, 2017.

* cited by examiner

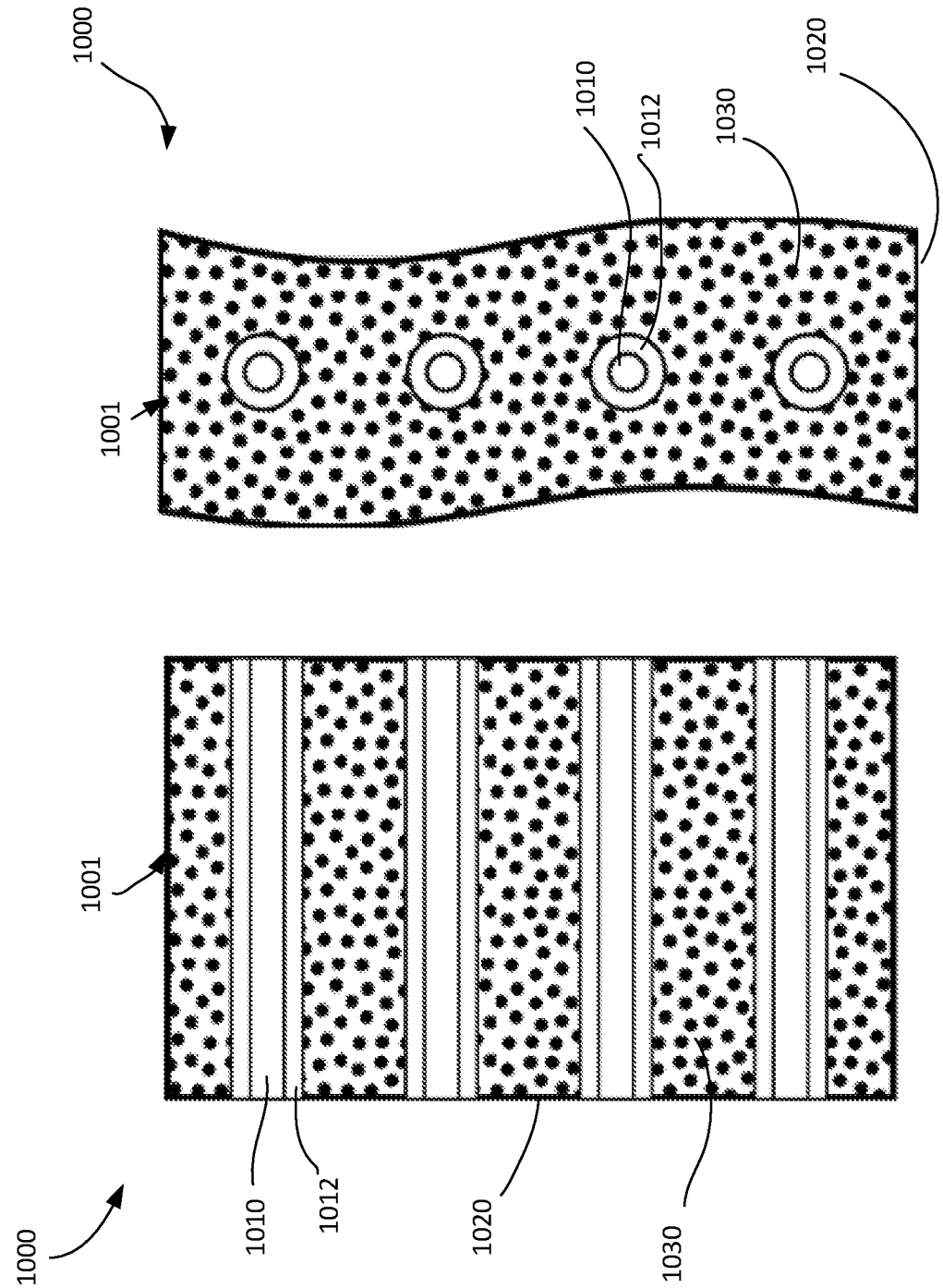

COMPOSITE MATERIAL FOR WATER TREATMENT

CROSS-REFERENCE TO RELATED APPLICATIONS

This application claims priority to U.S. Provisional Patent Application No. 62/410,006, filed Oct. 19, 2016, the entirety of which is incorporated herein by reference.

TECHNICAL FIELD

The present disclosure relates to water treatment, and more particularly, to composite materials for catalytic water treatment, systems and methods of use, and methods of production thereof.

BACKGROUND

Water scarcity is a significant global concern moving forward into the 21$^{st}$ century due to the effects of population growth, industrialization, and climate change. Water conservation and treatment are important strategies being pursued to address growing water demand.

Among the many water treatment methods known, advanced oxidation processes (AOPs), such as ozonation, $UV/H_2O_2$ treatment, and photocatalysis, have been considered adequate in treating highly persistent water pollutants, such as organic compounds at parts-per-million concentrations. Photocatalysis is an AOP whereby a photocatalytic material in water, upon illumination with light, affects highly oxidizing water treatment reactions for mineralizing organic pollutants, or reductive processes to remove inorganic pollutants. The photocatalytic material is not consumed in the water treatment process, and can theoretically be reused for continuous photocatalytic water treatment, without requiring addition of chemical species to the water. Typically, photocatalysts exhibit high efficiency when formulated into nanoparticles with high specific surface area, and dispersed into the contaminated water as a slurry during the treatment process.

Critical limitations inhibiting broad implementation of AOPs include the high capital and operating costs associated with AOP processes, particularly for treating large volumes of water. Other significant limitations of AOPs include chemical amendment of the water during the treatment process, which can result in safety hazards of handling highly-reactive chemicals on-site (e.g., $H_2O_2$), as well as difficulty dealing with residual concentrations of these compounds in water, along with byproducts formed.

In the case of photocatalysis, working with nanoparticle slurries can be challenging, primarily due to challenges in recovering the nanoparticles from the treated water for recycling in a cost-effective manner, and in preventing the release of free nanoparticles into the water. Furthermore, nanoparticle slurries are susceptible to aggregation into larger agglomerates in water, requiring significant energy expenditure to adequately mix the nanoparticle slurry to keep the nanoparticles in suspension without sedimentation. These challenges significantly limit the application of photocatalysis nanoparticle slurries, and catalyst nanoparticle slurries more generally, to the treatment of large volumes of water.

SUMMARY

According to an aspect of the disclosure, a composite material for treating contaminated water includes a porous matrix including a catalyst capable of facilitating a chemical reaction involving a contaminant of water, a magnetic material, and a binder capable of retaining the catalyst and the magnetic material in the porous matrix, and a density regulating portion disposed in the porous matrix providing the composite material with an average density separably distinct from that of the water.

The density regulation portion may cause the average density of the composite material to be sufficiently less than that of the water for the composite material to be buoyant in the water.

The porous matrix may include at least two domains, each domain retaining at most one of the catalyst and the magnetic material.

The density regulating portion may include a buoyant core, and wherein the buoyant core is coated by the porous matrix.

The porous matrix may include a first layer and a second layer, the first layer retaining the magnetic material, the second layer retaining the catalyst, the first layer coating the buoyant core and the second layer coating the first layer.

The porous matrix may include a first layer, a second layer, and a third layer, the first layer retaining the magnetic material, the third layer retaining the catalyst, the second layer providing adsorption sites for the chemical reaction, the first layer coating the buoyant core, the second layer coating the first layer, and the third layer coating the second layer.

The binder may include a mesoporous resin.

The binder may include a silica resin.

The binder may include a carbon resin.

The porous matrix may include a conductivity-enhancing functional additive retained by the binder.

The porous matrix may include a polarity-modifying functional additive retained by the binder.

The porous matrix may include an electric charge-modifying functional additive retained by the binder.

The porous matrix may be capable of adsorbing the contaminant to facilitate the chemical reaction.

The catalyst may include a photocatalyst, and the chemical reaction may include a photocatalytic reaction.

The photocatalyst may include a $TiO_2$ nanocrystal.

According to another aspect of the disclosure, a system for using a composite material for treatment of contaminated water includes a composite material including a porous matrix including a catalyst capable of facilitating a photocatalytic reaction involving a contaminant of water, a magnetic material, and a binder capable of retaining the catalyst and the magnetic material in the porous matrix, and a density regulating portion disposed in the porous matrix providing the composite material with an average density separably distinct from that of the water, an equilibrium unit configured to provide mixing of the composite material with the water, a reactor configured to provide light exposure to the catalyst of the composite material to facilitate the photocatalytic reaction, a magnetic separator configured to separate the composite material from the water based on a magnetic property of the magnetic material of the composite material, and a gravimetric separator configured to separate the composite material from the water based on the average density of the composite material and the water.

The density regulating portion may cause the average density of the composite material to be sufficiently less than that of the water for the composite material to be buoyant in the water.

The system may include a regeneration unit configured to regenerate the composite material for recycling into the equilibrium unit.

The system may include a size-exclusion separator configured to separate the composite material from the water based on size of the composite material.

According to another aspect of the disclosure, a method for treating contaminated water includes contacting water with a composite material, the composite material including a catalyst, a magnetic material, and a density regulating portion, the density regulating portion providing the composite material with an average density separably distinct from that of the water, facilitating a chemical reaction involving a contaminant of the water, separating the composite material from the water, the separating comprising at least one of separating the composite material from the water based on a magnetic property of the magnetic material of the composite material and separating the composite material from the water based on the average density of the composite material and the water.

The catalyst may include a photocatalyst, the chemical reaction may include a photocatalytic reaction, and the facilitating a chemical reaction may involve providing light exposure to the catalyst.

The catalyst may include an electrocatalyst, the chemical reaction may include an electrocatalytic reaction, and the facilitating a chemical reaction may involve applying a voltage across the composite material and the water.

The method may involve, prior to separating the composite material from the water, floating the composite material to a surface of the water by a buoyant property of the composite material.

The method may involve, following separating the composite material from the water, regenerating the composite material.

The method may involve mixing a chemical aid with the water, the chemical aid including one of an oxidizing agent and a reducing agent.

Contacting water with a composite material may involve adsorbing a contaminant from the water to the composite material.

Separating the composite material from the water may involve separating the composite material from the water by size exclusion filtration.

According to another aspect of the disclosure, a method for producing a composite material for water treatment includes mixing a catalysts, magnetic materials, and resin precursor to form a matrix precursor, mixing density regulating portions with the matrix precursor, and setting the matrix precursor to form a porous matrix having the catalysts and magnetic materials retained therein, and the density regulating portions disposed in the porous matrix.

The matrix precursor may include a plurality of batches, each batch comprising at most one of the catalysts and the magnetic materials. The mixing density regulating portions with the matrix precursor may involve mixing the plurality of batches sequentially with the density regulating portions.

The matrix precursor may include a first batch of matrix precursor retaining the magnetic materials and a second batch of matrix precursors retaining the catalysts. Mixing density regulating portions with the matrix precursor may involve sequentially mixing density regulating portions with the first batch of matrix precursor followed by the second batch of matrix precursor. Setting the matrix precursor may involve sequentially setting the first batch of matrix precursor after mixing therewith, followed by the second batch of matrix precursor after mixing therewith.

The matrix precursor may include a first batch of matrix precursor containing the magnetic materials, a second batch of matrix precursor, and a third batch of matrix precursors containing the catalysts. Coating density regulating portions with the matrix precursor may involve sequentially coating density regulating portions with the first batch of matrix precursor containing the magnetic materials followed by the second batch of matrix precursor followed by the third batch of matrix precursor containing the catalysts. Setting the matrix precursor may involve sequentially setting the first batch of matrix precursor after coating therewith, followed by the second batch of matrix precursor after coating therewith, followed by the third batch of matrix precursor after coating therewith.

The method may involve, prior to mixing density regulating portions with the matrix precursor, preparing the resin precursor. The preparing may involve partially polymerizing a phenolic compound with formaldehyde in presence of one of an acid catalyst or a base catalyst to form a partially polymerized resin precursor, mixing a pore templating agent with the resin precursor, and mixing a functionalizing dopant with the resin precursor.

The method may involve, prior to mixing density regulating portions with the matrix precursor, preparing the catalyst. The preparing may involve adsorbing a carbon-containing compound onto a surface of a semiconducting oxide nanomaterial and annealing a shell of graphitic carbon on the semiconducting oxide.

The method may involve, following setting the matrix precursor, washing the resin to remove at least one of a pore templating agent and a reaction byproduct from the porous matrix.

The method may involve, following washing the resin, calcining the resin.

The method may involve, following setting the matrix precursor, activating the resin to form micropores in the porous matrix.

The method may involve functionalizing the porous matrix.

Mixing catalysts, magnetic materials, and resin precursors may involve mixing functional additives.

The functional additives may include a conductivity-enhancing functional additive.

The functional additives may include a polarity-modifying functional additive.

The functional additives may include an electric charge-modifying functional additive.

BRIEF DESCRIPTION OF THE DRAWINGS

Non-limiting embodiments will now be described, by way of example only, with reference to the attached Figures, wherein:

FIG. 14A is a schematic diagram of a side cross-section of a flow-through array photoreactor water treatment system;

FIG. 14B is a schematic diagram of an axial cross-section of the water treatment system of FIG. 14A;

DETAILED DESCRIPTION

Figure 1:
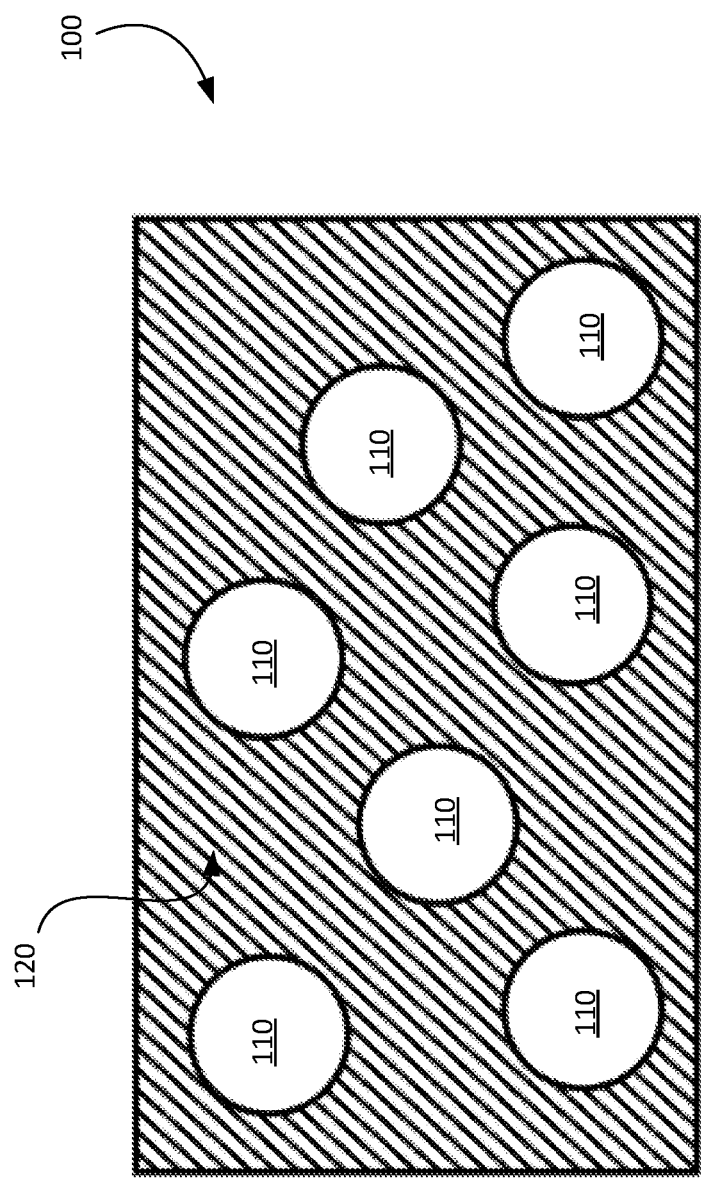
FIG. 1 is a schematic diagram of a cross section of a composite material.

The present disclosure relates to composite materials for water treatment. The composite materials include a porous matrix retaining a catalyst for facilitating chemical reactions involving contaminants of contaminated water. The porous matrix further includes a magnetic material. The catalyst and the magnetic material are retained in the porous matrix by a binder, such as a resin. The porous matrix has disposed within it a density-regulating portion. Systems and methods of use of the composite material are described, including applications involving the use of photocatalysts activated by solar, artificial, or ultraviolet (UV) light.

The inclusion of density regulating portions and magnetic materials into the composite material enables gravimetric and magnetic recovery and separation of the composite material from contaminated water. Use of the magnetic material in gravimetric separation may enable magnetic control for positioning of the composite materials to aid in gravimetric separation, or may be used to impart additional mixing of the composite materials in the water. Use of the density-regulation portion may aid in separation and reduce costs associated with magnetic separation processes. Furthermore, the combined application of magnetic separation and gravimetric separation provides a fail-safe separation process in the case of failure of one separation process. Where gravimetric separation and magnetic separation are applied simultaneously or sequentially, complementary enhancement of each separation process may be achieved. Such advantages are particularly useful in avoiding separation challenges when using photocatalytic slurries in water treatment. The recovery of catalyst particles may thus be improved, and unintentional release of catalyst particles into water may be mitigated. Inclusion of density regulating portions in the composite material may also reduce the amount of mixing energy used to adequately mix the composite material with the water being treated.

The density regulating portions may be buoyant in water, thus enabling removal of the composite materials from near the surface of a volume of treated water. This buoyant property can be used to implement a passive water treatment system, where little or no chemical or energy input is used to treat the water, in that sunlight can be used to activate the floating composite material for water treatment.

The porous matrix provided in the composite material can act as an adsorbent to concentrate water contaminants within pores of the porous matrix, increasing the effective local concentration of contaminants within the composite material available for interacting with catalysts dispersed therein, and thereby enhancing the efficiency of the photocatalytic treatment process, and the overall water treatment rate. The composite material can be provided with mesopores for effective adsorption of contaminants with particularly high molecular weights. Furthermore, the composite materials may be prepared in the form of a powder or slurry for water treatment, avoiding mass transfer limitations of immobilized photocatalytic systems. The porous matrix of the composite material further provides flexibility in its application to different catalytic processes in that the porous matrix may be adjusted to enable preferential adsorption of a specific water contaminant.

Thus, the present disclosure provides a composite material suitable for treating large volumes of water having recalcitrant or persistent water pollutants in a cost-efficient manner. Non-limiting embodiments of the composite material, systems and methods for use, and methods of manufacture are presented in the following Figures. For convenience, reference numerals may be repeated (with or without an offset) to indicate analogous components or features.

Composite Materials

FIG. 1 is a schematic diagram of a cross section of a composite material indicated generally at 100, according to a non-limiting embodiment. The composite material 100 includes a plurality of density regulating portions 110 contained or disposed within a porous matrix 120. The porous matrix 120 retains a catalyst and a magnetic material dispersed therein and retained by a binder, to be discussed in greater detail below. The composite material 100 is shown formed as a cake or brick, but it is to be understood that composite material 100 is an example only, and a variety of different structures are contemplated. For example, composite material 100 may be formed into different morphologies such as beads, platelets, fibers, coatings, particles, powders, foams, or films.

In the present embodiment, density regulating portions 110 are additives included in the composite material 100 to affect the average density of composite material 100 to facilitate gravimetric separation of the composite material 100 from water. In other words, the average density of the composite material 100 and the water are separably distinct so as to enable gravimetric separation. The density of water can be taken as about 1 g/mL. In various applications, the density regulating portions 110 may be provided as an additive having a density greater than water (greater than about 1 g/mL) to facilitate sedimentation and sinking of the composite material 100 for ease of separation, or may be provided as an additive having less density than water (less than about 1 g/mL) to facilitate buoyancy and flotation of the composite material 100 for ease of separation. In such embodiments, density regulating portions 110 provide a difference in density between the composite material 100 and the water.

In the present embodiment, density regulating portions 110 are provided as hollow glass microspheres having a density less than about 1 g/mL. In other embodiments, density regulating portions 110 may be provided as hollow inclusions more generally, including hollow microspheres of other materials, fly ash cenospheres, expanded perlite, or pockets of air. In still other embodiments, density regulating portions 110 may be provided as solid inclusions including solid glass, iron, plastic microbeads, or any other material provided the material affects the density of the composite material 100 to facilitate separation from water without introducing deleterious effects.

It is to be understood that density regulating portions 110 may be referred to as density regulating cores, such as in embodiments in which density regulating portions 110 includes spherical cores such as hollow microspheres, without deviating from the generality of the term, which contemplates that in some embodiments, density regulating portions 110 may be configured in other irregular non-spherical shapes, provided that the portions affect the density of the composite material 100 to facilitate separation from water.

Figure 2:
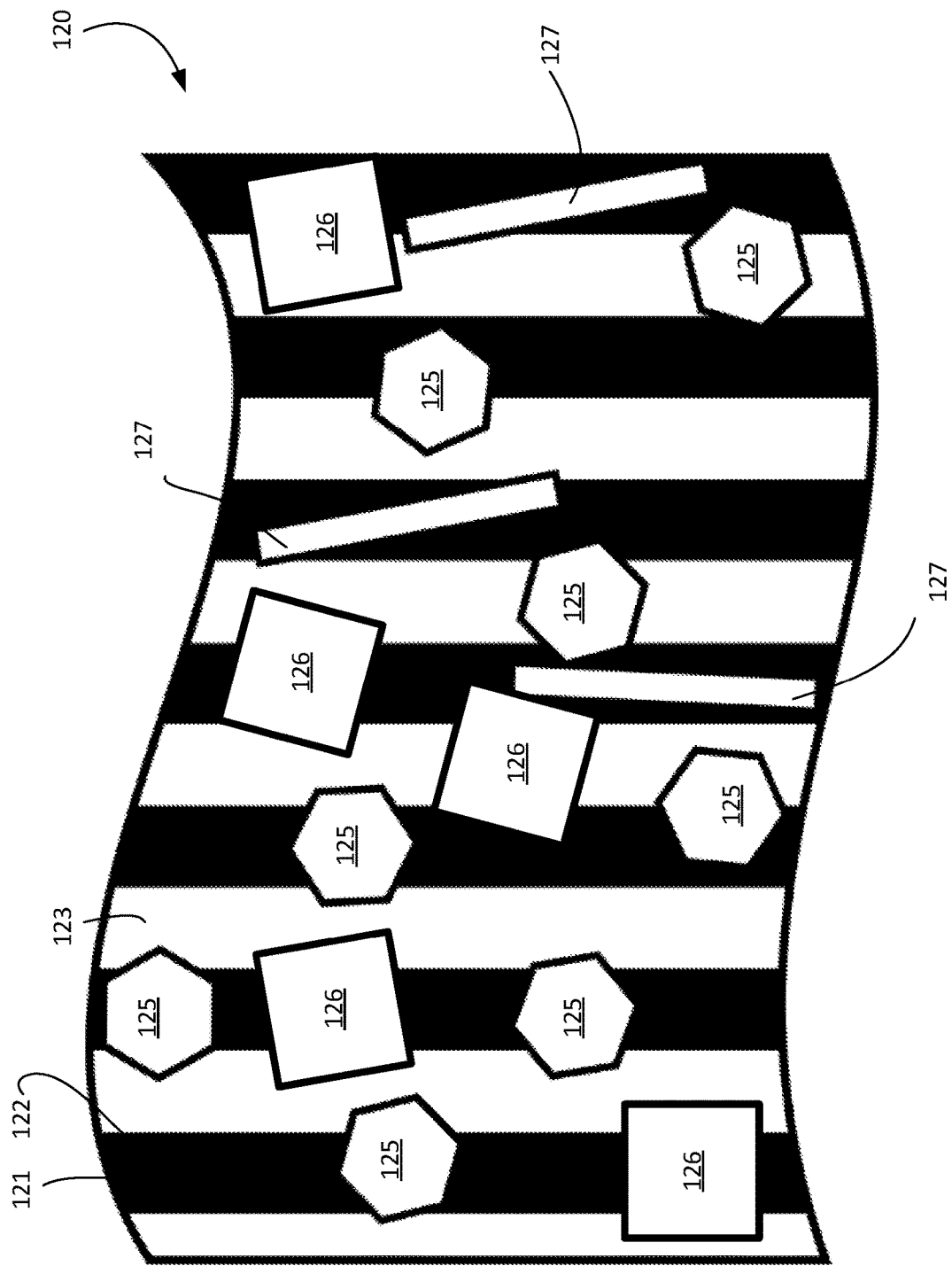
FIG. 2 is an enlarged schematic diagram of a cross section of a porous matrix of the composite material of FIG. 1.

FIG. 2 is an enlarged schematic diagram of a cross section of a porous matrix 120 of the composite material 100, according to a non-limiting embodiment. Porous matrix 120 includes a resin 121, which serves as a binder for binding within it a plurality of catalysts 125, magnetic material 126, and functional additives 127.

Resin 121 is selected from a group of materials which are resistant to photodissolution or degradation during the application of the composite material 100 to water treatment. In the present embodiment, resin 121 includes a mesoporous material, such as mesoporous silica. In other embodiments, resin 121 may include mesoporous carbon, doped mesoporous carbon, activated mesoporous carbon, or activated doped mesoporous carbon. In some embodiments, resin 121 includes an ordered mesoporous material. Resin 121 may also include mesoporous titania, a mesoporous hybrid silica-carbon material, or any other mesoporous oxide resistant to degradation during the application of the composite material in water treatment.

The resin 121 includes pore walls 122 separated by pore channels 123. The pore walls 122 and pore channels 123 are depicted as being arranged in a generally regular and parallel pattern, but it is to be understood that other configurations of the pore walls 122 and pore channels 123 are contemplated.

Functional additives 127 can be provided in resin 121 so as to provide more favorable surface properties, such as electric charge and polarity, to the composite material to impart more favorable adsorption properties to the composite material 100 when used to treat particular contaminants in the water. Examples of functional additives 127 include carbon nanotubes, semiconducting nanomaterials, graphene, reduced graphene oxide, graphene quantum dots, carbon nanodots, carbon nitride, graphitic carbon nitride, or any other co-catalyst or conductive nanomaterial. Functional additives 127 are provided to enhance the performance of the composite material for water treatment, and may include co-catalysts to enhance the reaction rate of the catalysts 125, or conductive materials to enhance the conductivity and electrochemical properties of the composite material. Furthermore, functional additives 127 can include dopants, such as nitrogen and sulfur dopants, which form functional groups or moieties in the porous matrix 120.

Magnetic material 126 can be provided in the form of magnetic particles dispersed throughout resin 121. In the present embodiment, magnetic material 126 includes magnetic nanoparticles which impart the composite material 100 with magnetism so as to facilitate magnetic recovery of the material in its application in water treatment. In the present embodiment, magnetic material 126 includes superparamagnetic iron oxide nanocrystals. In some embodiments, magnetic material 126 can include superparamagnetic iron oxide nanocrystals coated with a silica shell, cobalt ferrite nanocrystals, nickel ferrite nanocrystals, manganese ferrite nanocrystals, zinc ferrite nanocrystals, or any other material imparting magnetic properties to composite material 100.

In the present embodiment, catalysts 125 includes a semiconducting oxide photocatalyst including $TiO_2$ nanocrystals. In other embodiments, catalyst 125 may include another semiconducting oxide catalyst, such as $ZnO$, $SnO_2$, $WO_3$, a mixed oxide, or a reduced or oxygen-vacancy doped oxide or suboxide. Still in other embodiments, catalyst 125 may include catalysts other than photocatalysts, including an electrocatalyst, a sonocatalyst, an immobilized enzyme, or any other heterogeneous catalyst material having applications to water treatment.

Catalysts 125, magnetic material 126, and functional additives 127 may be embedded in the pore walls 122 of resin 121, or may be confined within the pore channels 123, as the case may be.

Figure 3A:
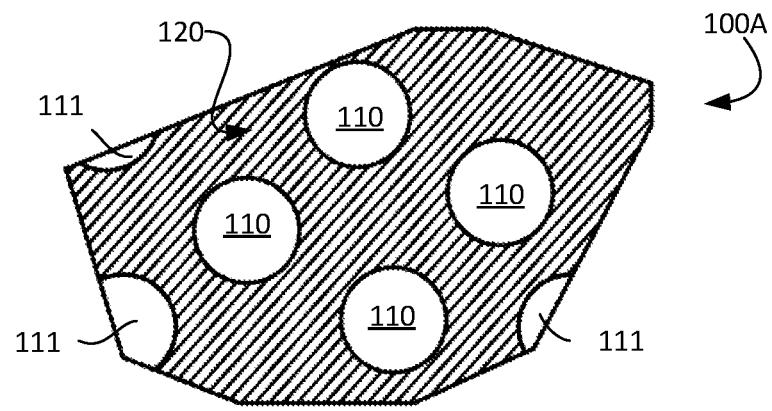
FIG. 3A is a schematic diagram of a cross section of a composite material in the form of an irregular chunk.

FIG. 3A is a schematic diagram of a cross section of a composite material 100A, according to a non-limiting embodiment. The composite material 100A is shown formed as an irregular brick in the form of an irregular chunk. Composite material 100A may be formed from a larger composite material 100 having been broken or crushed into smaller irregular chunks. Thus, composite material 100A also includes density regulating portions 110 disposed in a porous matrix 120 retaining a catalyst and magnetic material. As an irregular chunk, composite material 100A includes several partial density regulating portions 111 where the composite material 100A was broken along a line through a density regulating portion 110.

In the embodiments shown in FIGS. 1, 2, and 3A, the catalyst and magnetic material are in substantially homogeneous dispersion in the porous matrix 120. However, it is contemplated that in other embodiments, the catalyst and magnetic material may be dispersed heterogeneously, and that in some embodiments the catalyst and magnetic material may be spatially separated in different domains within the porous matrix 120, as shown in FIG. 3B below, rather than evenly dispersed throughout the porous matrix 120.

Figure 3B:
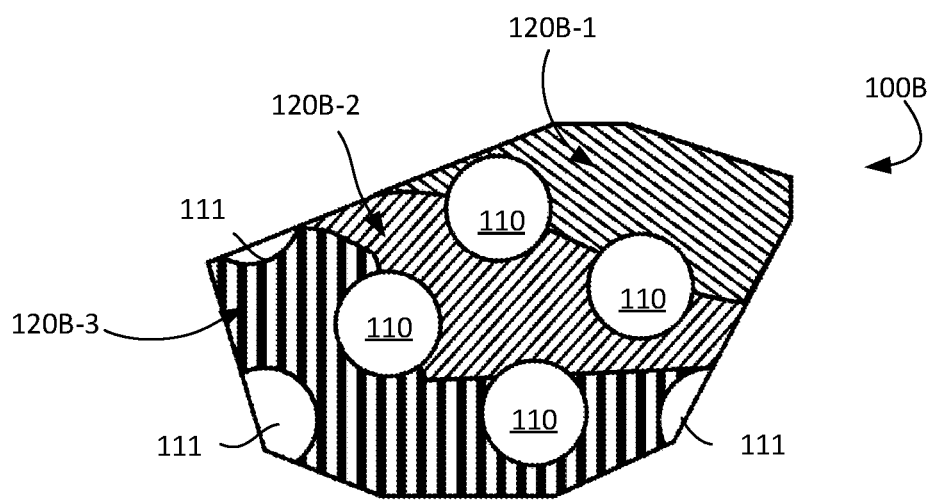
FIG. 3B is a schematic diagram of a cross section of a composite material in the form of an irregular chunk having multiple domains.

FIG. 3B is a schematic diagram of a cross section of a composite material 100B in the form of an irregular chunk having multiple domains, according to a non-limiting embodiment. In the present embodiment, the porous matrix is divided into three domains, a domain 120B-1 retaining a magnetic material 126, a relatively vacant region providing sites for adsorption of a contaminant into composite material 100 indicated as spacer domain 120B-2, and a domain 120B-3 retaining a catalyst 125. In some embodiments the spacer domain 120B-2 may further retain functional additives 127. It is to be understood that, in other embodiments, composite material 1006 may include one or more of each of the domains 120B-1, 120B-2, 120B-3.

Figure 3D:
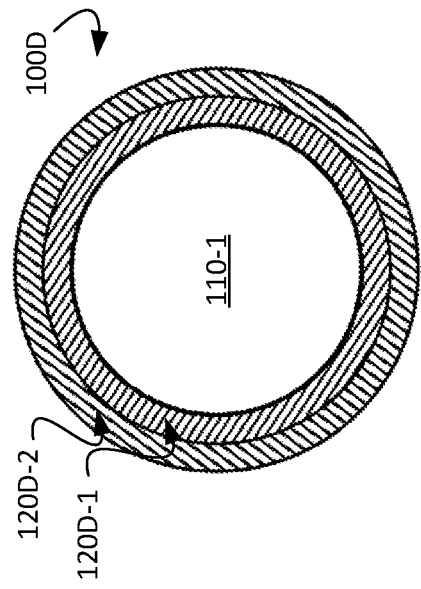
FIG. 3D is a schematic diagram of a cross-section of a composite material in the form of a core-shell structure having a two-layer shell.
Figure 3F:
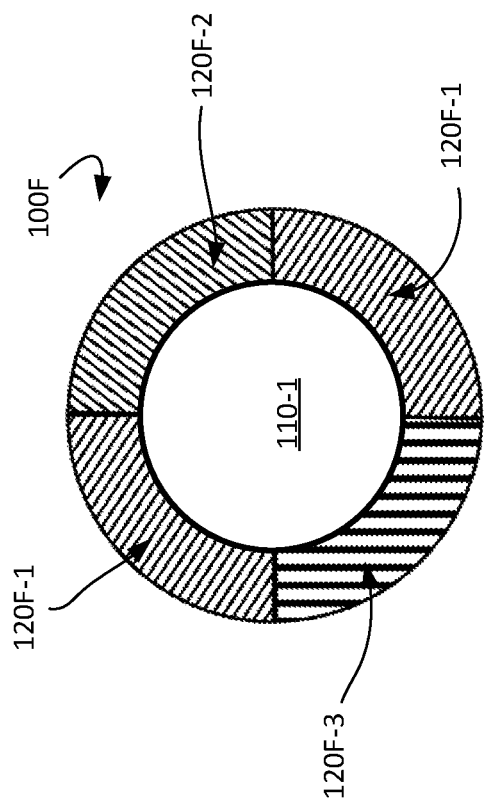
FIG. 3F is a schematic diagram of a cross-section of a composite material in the form of a core-shell structure having a shell with multiple domains.
Figure 3C:
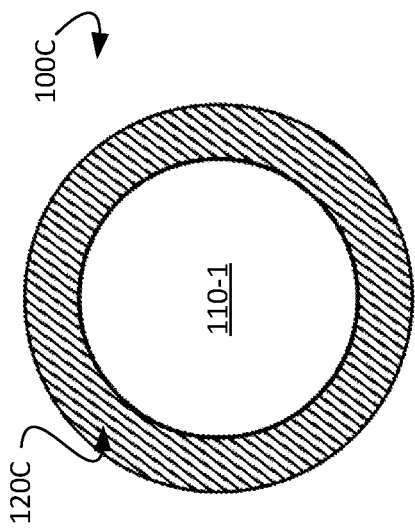
FIG. 3C is a schematic diagram of a cross-section of a composite material in the form of a core-shell structure.

FIG. 3C is a schematic diagram of a cross-section of a composite material 100C in the form of a core-shell structure, according to a non-limiting embodiment. The composite material 100C includes a density regulating core 110-1 contained or disposed in a porous matrix 120C, forming a single layer of a shell surrounding density regulating core 110-1.

FIG. 3D is a schematic diagram of a cross-section of a composite material 100D in the form of a core-shell structure having a two-layer shell, according to a non-limiting embodiment. Composite material 100D includes multiple domains, or layers, of porous matrix 120. Composite material includes a first layer 120D-1 and a second layer 120D-2, each provided as a shell or coating layer around a density regulating core 110-1. The first layer 120D-1 retains a magnetic material 126 embedded therein, and the second layer 120D-2 retains a catalyst 125 embedded therein. It is to be understood that, in other embodiments, composite material 100D may include one or more of each of the layers 120D-1, 120D-2.

Figure 3E:
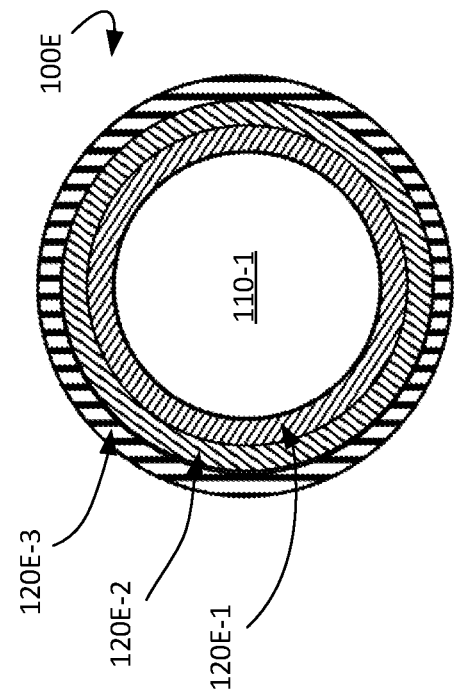
FIG. 3E is a schematic diagram of a cross-section of a composite material in the form of a core-shell structure having a three-layer shell.

FIG. 3E is a schematic diagram of a cross-section of a composite material 100E in the form of a core-shell structure having a three-layer shell, according to a non-limiting embodiment. Composite material 100D includes multiple domains, or layers, of porous matrix 120. Composite material 100E includes a first layer 120E-1, a second layer 120E-2, and a third layer 120E-3, each provided as a shell or coating layer around a density regulating core 110-1. The first layer 120E-1 retains a magnetic material 126 therein, the second layer 120E-2 is a relatively vacant region providing sites for adsorption of a contaminant into composite material 100, and the third layer 120E-3 retains a catalyst 125 therein. In some embodiments, the second layer 120E-2 may further retain functional additives 127. It is to be understood that, in other embodiments, composite material 100E may include one or more of each of the layers 120E-1, 120E-2, 120E-3.

FIG. 3F is a schematic diagram of a cross-section of a composite material 100F in the form of a core-shell structure having a shell with multiple domains, according to a non-limiting embodiment. Composite material 100F includes a first domain 120E-1, a second domain 120E-2, and a third domain 120E-3, each provided as a portion of a shell coating layer around a density regulating core 110-1. The first domain 120E-1 retains a magnetic material 126 therein, the second domain 120E-2 is a relatively vacant region providing sites for adsorption of a contaminant into composite material 100, and the third domain 120E-3 retains a catalyst 125 therein. It is to be understood that, in other embodiments, composite material 100F may include one or more of each of the domains 120E-1, 120E-2, 120E-3.

Thus, in view of FIGS. 1, and 3A-F, it can be seen that a composite material 100 can be formed into a variety of configurations, including cakes, bricks, chunks, and core-shell structures. Composite material 100 may also be formed into different morphologies such as beads, platelets, fibers, coatings, particles, powders, foams, or films. Furthermore, the porous structure may retain catalysts 125, magnetic material 126, and functional additives 127 distributed homogenously throughout, or distributed heterogeneously in domains or layers. In still other embodiments, the distinction between the domains or layers may not be strictly distinct, and may overlap or merge into one another in irregular configurations.

Figure 4:
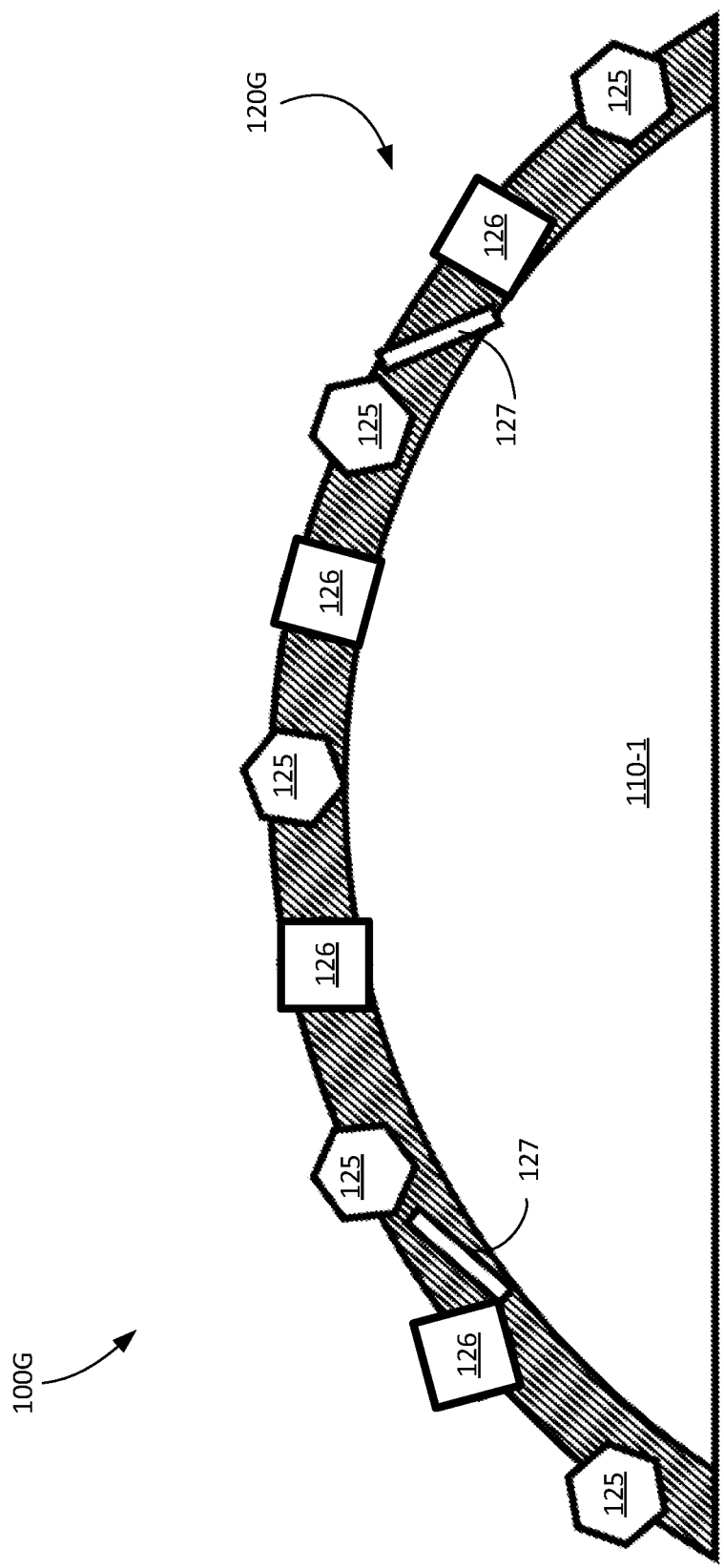
FIG. 4 is an enlarged schematic diagram of a cross-section of a composite material showing the porous matrix thereof, according to a non-limiting embodiment.

FIG. 4 is an enlarged schematic diagram of a cross-section of a composite material 100G showing the porous matrix 120G, according to a non-limiting embodiment. Porous matrix 120G includes a plurality of catalysts 125, magnetic material 126, and functional additives 127 partially embedded in a porous matrix 120. In the present embodiment, the preponderance of catalysts 125 are located primarily at or near the surface of porous matrix 120G at the interface with the water being treated. Porous matrix 120G is provided as a thin film in a shell or coating layer around a density regulating core 110-1, as opposite to the embodiment shown in FIG. 2 showing a relatively thick layer.

As discussed previously, catalysts 125 may include $TiO_2$ nanocrystals, other semiconducting oxide catalysts such as $ZnO$, $SnO_2$, $WO_3$, a mixed oxide, or a reduced or oxygen-vacancy doped oxide or suboxide, or electrocatalysts, sonocatalysts, immobilized enzymes or other heterogeneous catalysts having applications to water treatment. In some embodiments, catalyst 125 includes a catalyst particle 125A, 125B, as shown in FIGS. 5 and 6 below.

Figure 5:
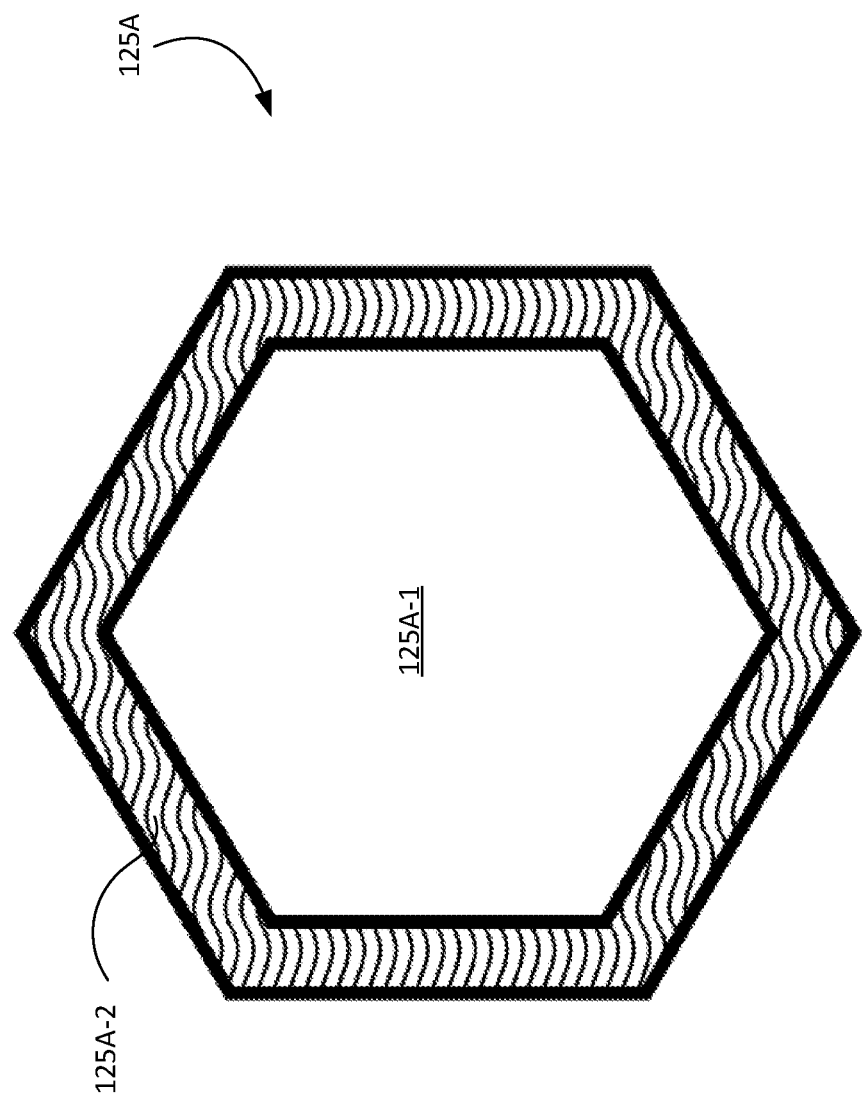
FIG. 5 is a schematic diagram of a cross section of a photocatalyst particle.
Figure 6:
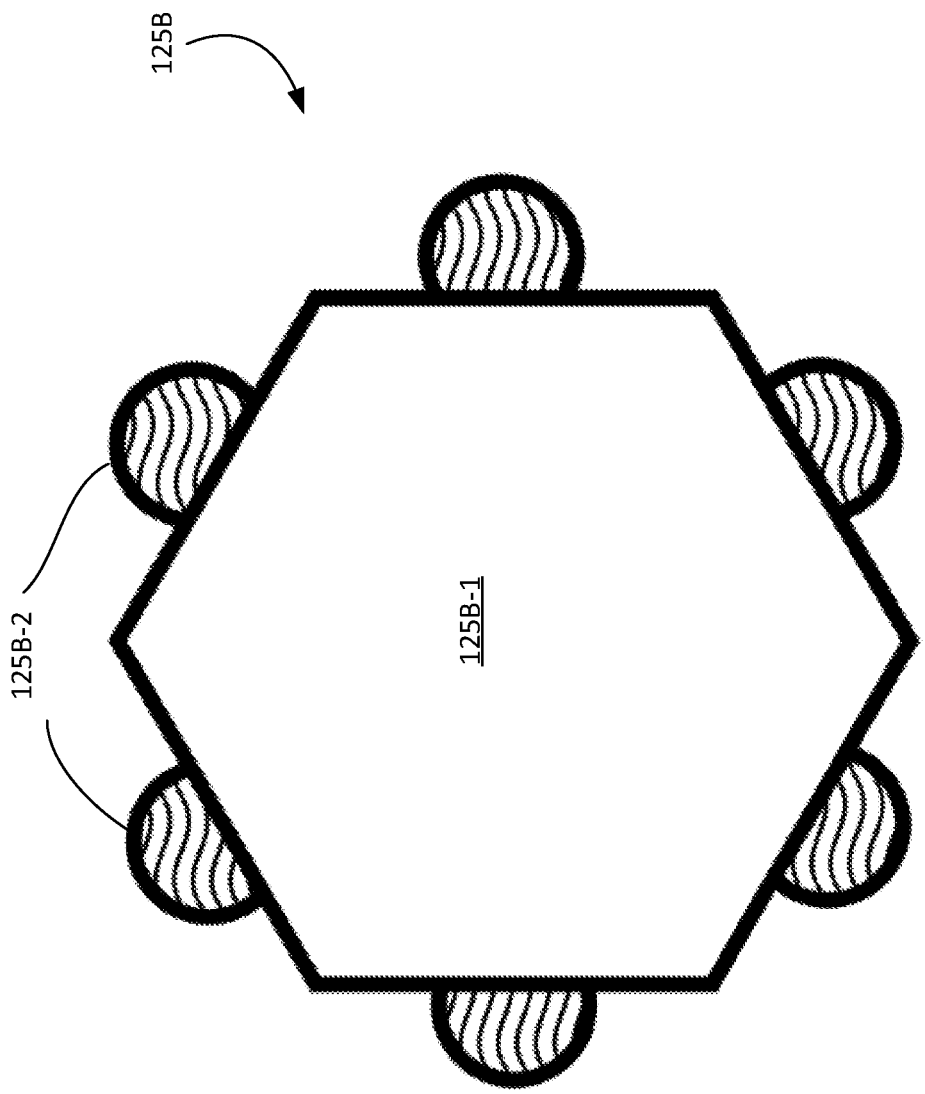
FIG. 6 is a schematic diagram of a cross section of another photocatalyst particle.

FIG. 5 is a schematic diagram of a cross section of a catalyst particle 125A, according to a non-limiting embodiment. Catalyst particle 125A includes a core layer 125A-1 and a shell layer 125A-2 around core layer 125A-1. Shell layer 125A-2 is provided to enhance the reactivity of the catalyst particle 125A for water treatment by facilitating separation of electron-hole pairs from photogenerated excitons in core layer 125A-1, thereby improving the quantum efficiency of the catalyst particle 125A.

In the present embodiment, core layer 125A-1 includes a nanocrystal of the semiconducting oxide $TiO_2$. In other embodiments, other semiconducting oxides including $ZnO$, $SnO_2$, $WO_3$, or a mixed oxide, or a reduced or oxygen-vacancy doped oxide or suboxide, may be used.

In the present embodiment, shell layer 125A-2 includes a thin film of graphitic carbon. In other embodiments, shell layer 125A-2 may include a thin film of amorphous, disordered or defective titania. In still other embodiments, shell layer 125A-2 may be a doped or fluorinated semiconducting oxide. In still other embodiments, shell layer 125A-2 may include an electrically conductive material. Thus, it is to be understood that a variety of different structures are contemplated which may enhance the reactivity of catalyst particle 125A.

FIG. 6 is a schematic diagram of a cross section of a photocatalyst particle 125B, according to a non-limiting embodiment. Photocatalyst particle 125B includes a core layer 125B-1 and a plurality of nanoparticles 125B-2 dispersed on the surface of core layer 125B-1.

In the present embodiment, core layer 125B-1 includes a nanocrystal of the semiconducting oxide $TiO_2$. In other embodiments, other semiconducting oxides including $ZnO$, $SnO_2$, $WO_3$, or a mixed oxide, or a reduced or oxygen-vacancy doped oxide or suboxide, may be used.

Nanoparticles 125B-2 are provided to enhance the reactivity of the photocatalyst particle 125B for water treatment by facilitating separation of electron-hole pairs from photo-generated excitons in core layer 125B-1, thereby improving the quantum efficiency of the photocatalyst particle 125B. Nanoparticles 125B-2 may include an amorphous cluster of transition metal oxides. In some embodiments, nanoparticles 125B-2 include a metal nanocrystal of silver (Ag). In other embodiments, other metal nanocrystals including those of palladium (Pd) or platinum (Pt), may be used. In other embodiments, nanoparticles 125B-2 include a semiconducting quantum dot, such as iron oxide or copper oxide. In still other embodiments, nanoparticles 125B-2 includes amorphous clusters of transition metal oxides, such as chromium, manganese, iron, cobalt, nickel, or copper oxides. Thus, it is to be understood that a variety of different materials are contemplated for nanoparticles 125B-2, including metal or semiconductors resistant to degradation during the application to water treatment.

Methods for Producing Recyclable Composite Materials

Figure 7:
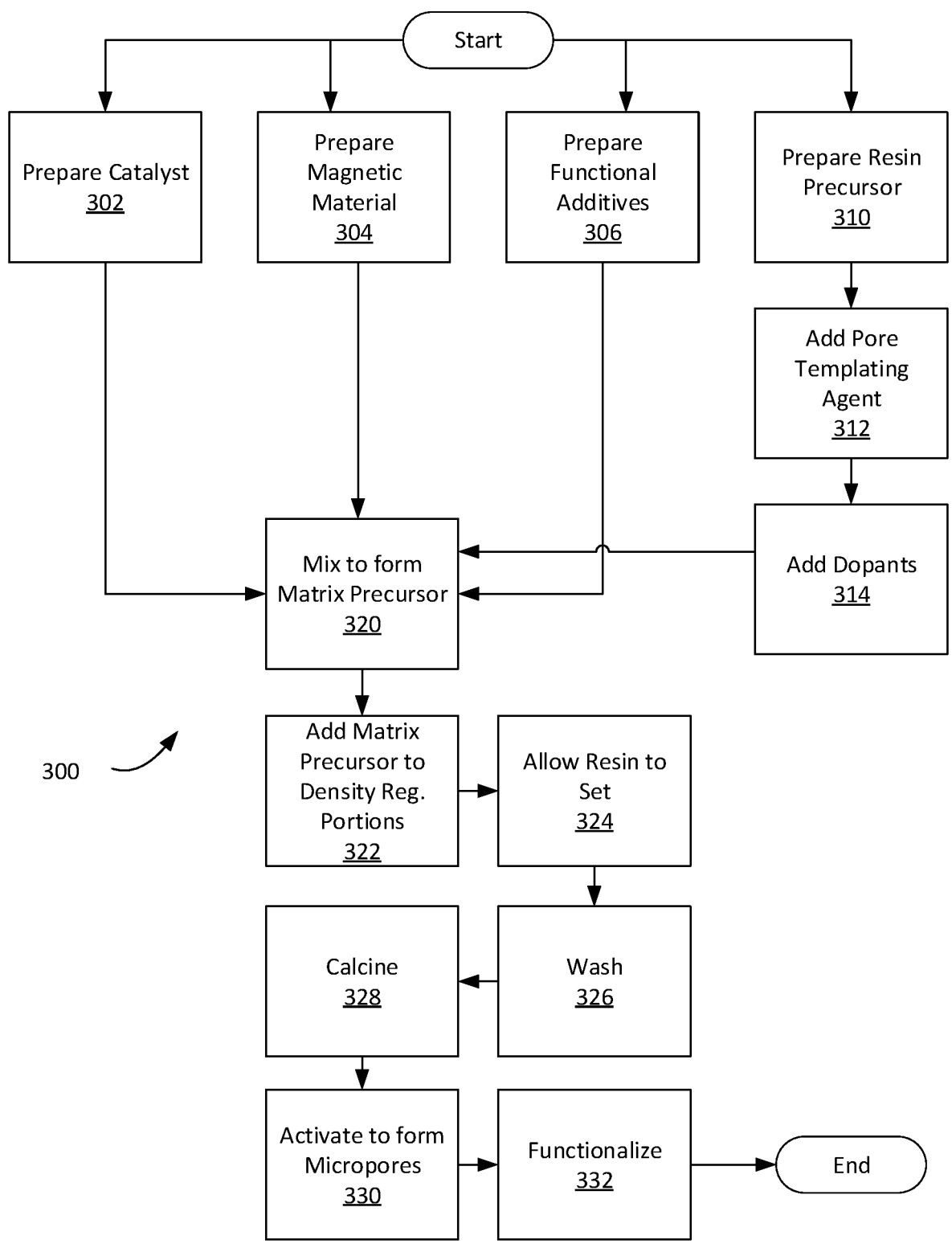
FIG. 7 is a flow chart depicting a method for producing a composite material.

FIG. 7 is a flowchart depicting a method 300 for producing a composite material, according to a non-limiting embodiment. The method 300 is generally described as being performed to produce a composite material 100, having density regulating cores 110-1, porous matrix 120, catalyst 125, magnetic material 126, and functional additives 127. However, it is to be understood that variations to method 300 are contemplated for the production of composite materials 100A, 100B, 100C, 100D, 100E, 100F, and 100G, where made explicit or implied given the surrounding context. Furthermore, it is to be understood that certain blocks of the method 400 may be omitted or rearranged, and that the blocks of method 300 need not be performed in the exact sequence as shown.

At block 302, catalysts 125 are prepared. Catalyst 125 may be either procured or synthesized, and may be provided as a powder or slurry. Catalyst 125 may also be synthesized from a catalyst precursor.

Where catalyst 125 is procured, in some embodiments, the catalyst provided includes a semiconducting oxide, such as $TiO_2$, $ZnO$, $SnO_2$, $WO_3$, a mixed oxide, or a reduced or oxygen-vacancy doped oxide or suboxide. In a some embodiments, the catalyst is a photocatalyst comprising $TiO_2$ nanocrystals.

In some embodiments, the catalyst 125 prepared at block 302 includes a catalyst particle 125A having a core-shell structure as shown in FIG. 5. In such embodiments, where catalyst particle 125A is to be synthesized, synthesis of catalyst particle 125A includes adsorption of a carbon-containing compound onto the surface of a semiconducting oxide nanomaterial, and the mixture being annealed under inert atmosphere to produce a thin shell of graphitic carbon on the semiconducting oxide. In some of such embodiments, the carbon-containing compound is melamine, and the semiconducting oxide nanomaterial is $TiO_2$ nanocrystals.

In other of such embodiments, a sol-gel reaction is used to deposit a thin shell of amorphous titania on the surface of a semiconducting oxide nanomaterial, and the mixture is annealed under inert atmosphere to produce a thin shell of disordered or defective titania on the semiconducting oxide. In some of such embodiments, the semiconducting oxide nanomaterial is $TiO_2$ nanocrystals, and urea is mixed with the powder prior to annealing. In another embodiment, the photocatalyst is synthesized to provide a structure as shown schematically in FIG. 6. In such embodiments, metal nanocrystals are formed on the surface of a semiconducting oxide nanomaterial through a photoreduction of metal salts from a solution also containing an electron donor. In some of such embodiments, the metal salt is a salt of Ag, Pd, or Pt, the semiconducting oxide nanomaterial is $TiO_2$ nanocrystals, and the electron donor is an alcohol.

Where catalyst 125 is to be synthesized from a catalyst precursor, in some embodiments, photocatalyst precursor includes $TiCl_4$, or a $TiCl_4$ solution. However, it is to be understood that a variety of photocatalyst precursors are contemplated. For example, the photocatalyst precursor may include a titanium salt, a titanium alkoxide, a zinc salt, a zinc alkoxide, a tin salt, a tin alkoxide, a tungsten salt, a tungsten alkoxide, a metal salt, a metal alkoxide, a combination of metal salts and alkoxides, solutions thereof, or any other precursor capable of forming a photocatalytic material in the course of this described production method.

At block 304, magnetic material 126 is prepared. A magnetic material 126 may be procured or synthesized, and provided as a powder or slurry. In some embodiments, the magnetic material 126 includes magnetic nanoparticles. In some of such embodiments, the magnetic nanoparticles include superparamagnetic iron oxide nanocrystals. In one embodiment, these superparamagnetic iron oxide nanocrystals can be synthesized through a co-precipitation reaction of ferrous and ferric salts in the presence of a base. In another embodiment, these superparamagnetic iron oxide nanocrystals can be synthesized through a thermal decomposition reaction of an organometallic iron complex, followed by phase transfer of the produced nanoparticles into water through use of a surfactant. However, it is to be understood that a variety of different magnetic materials are contemplated. For example, the magnetic material provided in block 304 may include may include superparamagnetic iron oxide nanocrystals coated with a silica shell, cobalt ferrite nanocrystals, nickel ferrite nanocrystals, manganese ferrite nanocrystals, zinc ferrite nanocrystals, or any other magnetic material.

At block 306, functional additives 127 are prepared. Functional additives 127 can be procured or synthesized.

In some embodiments, the functional additives 127 provided in block 306 include carbon nanotubes. However, it is to be understood that a variety of different functional additives 127 are contemplated. For example, the functional additives 127 provided in block 306 may include may include a semiconducting nanomaterial, graphene, reduced graphene oxide, graphene quantum dots, carbon nanodots, carbon nitride, graphitic carbon nitride, or any other co-catalyst or conductive nanomaterial.

At block 310, a resin precursor is prepared. The resin precursor may be prepared as a liquid solution or paste. This resin precursor includes a solution of monomeric and/or polymeric compounds capable of forming a resin upon further reaction as described below.

In some embodiments, the resin precursor provided in block 310 includes a thermosetting polymeric resin, including a phenolic resin such as Resol® or Novolac®. In such embodiments, the Resol® or Novolac® is formed through the partial polymerization of a phenolic compound with formaldehyde, or urea, or a mixture of formaldehyde and urea, in the presence of an acid or base catalyst. In one embodiment, the phenolic compound is phenol. However, it is to be understood that a variety of different phenolic compounds are contemplated. For example, the phenolic compound may include resorcinol or phloroglucinol. In another embodiment, the resin precursor provided in block 310 includes a silica or metal oxide sol-gel solution. In this embodiment, the silica or metal oxide sol-gel solution is formed through the hydrolysis and partial condensation of silicon or metal salts or alkoxides, in the presence of an acid or base catalyst. In one embodiment, the silicon alkoxide is tetraethylorthosilicate (TEOS), hydrolysed in the presence of hydrochloric acid. In another embodiment, the silicon salt is sodium silicate or sodium metasilicate. However, it is to be understood that a variety of different sol-gel solutions are contemplated. For example, the sol-gel solution may be formed through the hydrolysis and partial condensation of titanium, tin, niobium, tantalum, tungsten, aluminum, zinc or zirconium salts or alkoxides, or any other metal salt or alkoxide capable of forming a sol-gel solution and condensation to form a resin. In one embodiment, the resin precursor provided in block 310 includes a mixture of both a phenolic resin and a silica or metal oxide sol-gel solution.

At block 312, a pore templating agent is added to the resin precursor. The pore templating agent is provided to induce porosity in the resin, and is later removed.

In some embodiments, the pore templating agent provided in block 312 includes a surfactant. In some embodiments, the pore templating agent provided in block 312 includes a non-ionic surfactant. In a further embodiment, the pore templating agent includes a poloxamer or Pluronic-class nonionic surfactant. In a further embodiment, the pore templating agent includes Pluronic® F127. However, it is to be understood that a variety of pore templating agents are contemplated. For example, the pore templating agent provided in block 312 may include a cationic surfactant, an anionic surfactant, a nanomaterial, or any other material capable of templating pores in the resin structure, and removed or extracted from the matrix later in the synthesis process.

In other embodiments, the pore templating agent is instead added to the catalyst 125 slurry, following block 302, rather than to the resin precursor. In still other embodiments, the pore templating agent is instead added directly at block 320 discussed below.

At block 314, dopants are added to the resin precursor. In some embodiments, a dopant precursor is added to the resin precursor, to be further activated.

In some embodiments, the dopant or dopant precursors added in block 314 include a nitrogen-containing compound. In one embodiment, the nitrogen-containing compound is dicyandiamide. However, it is to be understood that a variety of nitrogen-containing compounds are contemplated. For example, the nitrogen-containing compound may include urea, melamine, ethylenediamine, diethylenetriamine, hydrogen cyanide, cyanate, or any nitrogen-containing compound capable of forming nitrogen-containing functional groups or moieties in the matrix of the composite material. In another embodiment, the dopant or dopant precursors added in block 314 include a sulfur-containing compound. In one embodiment, the sulfur-containing compound is 2-thiophenecarboxaldehyde. However, it is to be understood that a variety of sulfur-containing compounds are contemplated. For example, the sulfur-containing compound may include any sulfur-containing compound capable of forming sulfur-containing functional groups or moieties in the matrix of the composite material.

At block 320, the catalysts, magnetic materials, and functional additives, and resin precursor having pore templating agent and dopants, are mixed to form a matrix precursor.

In some embodiments, the mixing provided in block 320 is performed in the presence of ultrasonic irradiation to aid in the dispersion of the various components of the mixture. In some embodiments, additional solvents are provided to dilute the mixture, and to facilitate mixing. In one embodiment, the additional solvents are water or ethanol, or a mixture of water and ethanol. However, it is to be understood that a variety of mixing conditions are contemplated. For example, the various components of the mixture may be mixed together using a homogenizer, high-shear mixer, or any other means of mixing.

At block 322, the matrix precursor formed at block 320 is mixed with density regulating portions 110. The density regulating portions 110 may be provided as a powder or slurry. In the present exemplary embodiment, density regulating cores 110-1 are provided as hollow glass microspheres forming density regulating cores of the type described in FIGS. 3C through 3F. However, it is to be understood that this is not limiting, and that method 300 is contemplated with the other density regulating cores 110-1 discussed herein.

The matrix precursor formed at block 320 is added to density regulating portions 110 in an appropriate ratio and at an appropriate rate so as to either form a brick- or cake-like composite material 100 as shown in FIG. 1, or a core-shell structure of composite material 100C as shown in FIG. 3C.

The density regulating portions 110 may be provided with a density greater or substantially greater than water, to facilitate sedimentation and sinking of the composite material 100; a density similar to water (neutral density), to facilitate energy efficient mixing with water; or with a density less than that of water, less than about 1 g/mL, to facilitate flotation of the composite material 100 (in some cases substantially less dense than water). For density regulating portions 110 with a density less than about 1 g/mL, the density regulating portions 110 may be provided as either hollow or solid inclusions. In one embodiment, the density regulating portions 110 are provided as hollow glass microspheres. However, a variety of structures to form density regulating portions 110 with a density less than about 1 g/mL are contemplated. For example, a density regulating core may be provided as a small pocket of air, a plastic microbead, any type of hollow microsphere, a fly ash cenosphere, expanded perlite, or any other material affecting the final density of the composite material 100 to facilitate its separation from water.

At block 324, the mixture of block 322 is treated or dried so as to allow the resin to set to further polymerize the monomeric or oligomeric compounds of the resin precursor prepared at block 310 to form a resin 121. Setting the resin binds 121 binds the catalysts 125, magnetic materials 126, and functional additives 127, into a porous matrix 120 having pore walls 122 and pore channels 123 as exemplified in the manner described in FIG. 2, formed around density regulating portions 110 as exemplified in the manner described in FIGS. 1, 3A through 3F.

In some embodiments, the treatment to allow the resin to set in block 324 includes evaporating solvents from the product of block 322. In some embodiments, this evaporation process includes an evaporation-induced self-assembly of the pore-templating agent in the matrix precursor mixture. In other embodiments, the evaporation-induced self-assembly is followed by a thermosetting or thermopolymerization treatment in the temperature range of about 50-150° C., to further polymerize the monomeric or oligomeric compounds of block 310 to form a resin. However, it is to be understood that a variety of setting treatments are contemplated in block 324. For example, the treatment to allow the resin to set in block 324 may include drying the product of block 322, by spray drying, fluidized bed drying, freeze drying, supercritical drying, or exposing the matrix precursor to a light source, adjusting the pH of the mixture, or any other treatment to allow for further polymerization of the monomeric or oligomeric compounds of block 310 to form a resin.

At block 326, the set resin of block 324 is washed to remove the pore templating agent added at block 312 along with any other reaction byproducts that may have been generated. The product of block 326 is then dried, and may be powdered.

In some embodiments, the washing in block 326 is carried out by rinsing the product of block 324 with a solvent. In one embodiment, the solvent is water or an alcohol. In a further embodiment, the solvent is ethanol. In another embodiment, the washing in block 326 is carried out by rinsing the product of block 324 with a solvent at elevated temperature, to accelerate the extraction of the pore templating agent or any other reaction byproducts from the composite material. However, it is to be understood that a variety of washing treatments are contemplated in block 326. For example, the washing in block 326 may include exposing the product of block 324 to light, exposing it to an electric field, washing the product in the presence of ultrasonic irradiation, Soxhlet extraction, or any other washing treatment to aid in the extraction of the pore templating agent or any other reaction byproducts from the composite material.

At block 328, the washed product of block 326 is then calcined to further set the resin, facilitate additional reactions within the matrix, and to further remove the pore templating agent provided in block 312.

In some embodiments, the calcination provided in block 328 is carried out at greater than about 300° C. in air. In one embodiment, the calcination is carried out at about 400° C. with about a 1° C./min ramp rate in air. In another embodiment, the calcination is carried out at greater than about 300° C. under flowing inert gas. In another embodiment, the calcination is carried out at about 600° C. with about a 1° C./min ramp rate under flowing $N_2$ or Ar. In another embodiment, agitation or mixing is provided during the calcination of block 328, to facilitate removal of byproducts formed during the calcination treatment. However, it is to be understood that a variety of calcination treatments are contemplated in block 328. For example, the calcination may include heat treatment under vacuum at greater than about 300° C., heat treatment in the presence of steam, heat treatment in the presence of a small fraction of $O_2$ in an inert carrier gas, heat treatment in the presence of a small fraction of $H_2$ in an inert carrier gas, or any other calcination treatment to further set the resin, facilitate additional reactions within the matrix, and further remove the pore templating agent provided in block 312.

At block 330, the calcined material of block 328 is further activated to induce the formation of micropores in the matrix and improve the specific surface area and adsorption properties of the material.

In some embodiments, the activation provided in 330 includes annealing the product of block 328 under a flowing activation gas at a higher temperature than the calcination treatment provided in block 328. In one embodiment, the activation gas is $CO_2$, and the higher temperature is about 700° C. In another embodiment, the activation gas is steam in an inert carrier gas. However, it is to be understood that a variety of activation treatments are contemplated in block 330. For example, the activation provided in block 330 may include annealing a mixture of the product of block 328 and KOH under inert atmosphere, annealing a mixture of the product of block 328 and sodium amide under inert atmosphere, annealing a mixture of the product of block 328 and a salt under inert atmosphere, or any other activation treatment to induce the formation of micropores in the matrix, and improve the specific surface area and adsorption properties of the composite material.

At block 332, the activated material of block 330 is further functionalized to impart additional favourable properties to the material.

In some embodiments, the functionalization provided in block 332 includes annealing the product of block 330 in the presence of a reactive gas. In one embodiment, the reactive gas is $NH_3$ or $H_2S$. In another embodiment, the functionalization provided in 332 includes reacting the product of block 330 with a precursor to form a corresponding class of functional groups or moieties in the matrix. In one embodiment, the precursor is $H_2SO_4$ to form sulfur-containing functional groups in the matrix. In another embodiment, the precursor is a small molecule amine to form nitrogen-containing functional groups in the matrix, for example, ethylenediamine, diethylenetriamine, or hydrogen cyanide. However, it is to be understood that a variety of functionalization treatments are contemplated in block 332. For example, the functionalization provided in 332 may include reacting the product of block 330 with a silane reagent, such as an aminosilane, reacting the product of block 330 through a three step reaction comprising oxidation, acylation, and amidation, or any other functionalization designed to add specific chemical functional groups to the matrix of the material.

It is to be understood that, in some embodiments, blocks 306, 312, 314, 326, 328, 330, 332 may be considered as optional. It is contemplated that in some embodiments various combinations of these blocks may be employed or omitted.

However, where a pore templating agent is provided in block 312, washing at block 326 and/or calcining at block 328 is preferred.

It is to be understood that in block 320, the catalyst 125 provided in block 302, the magnetic material 126 provided in block 304, the functional additives 127 provided in block 306, and the resin provided in blocks 310 through 314, may either be mixed simultaneously in one batch, or mixed sequentially in separate batches, or mixed continuously or semi-continuously in an equilibrium unit.

Where a single layer of porous matrix 120 is desired, such as shown in FIGS. 1, 2, 3A and 3C, the catalyst 125, magnetic material 126, and functional additives 127 are to be mixed simultaneously.

Where separate layers of porous matrix 120 is desired, such as those shown in FIG. 3D or 3E, separate batches are to be mixed and added to density regulating portions 110 sequentially. For example, the catalyst 125 may be mixed with a resin to produce one matrix precursor, while the magnetic materials 126 may separately mixed with a resin to produce a second matrix precursor. Each matrix precursor may then be added sequentially to density regulating portions 110, allowing the resin to set at block 324 between sequential mixings. Thus a composite material 100D having a first layer 120D-1 and a second layer 120D-2 may be produced. Further, where a first batch of resin is mixed with a catalyst 125, a second batch of resin is mixed with a magnetic material 126, and where a third batch of resin is mixed (with or without functional additives 127), and where each batch is sequentially mixed with density regulating portions 110, it can be shown that a composite material 100E having a first layer 120E-1, second layer 120E-2, and third layer 120E-3 may be produced. Where the optional washing, calcination, activation, or functionalization of any of such layers is desired, such processes may take place between addition and setting at block 324 of sequential layers of matrix precursors.

In such examples, the resin precursors mixed with each the catalyst 125, the magnetic materials 126, or functional additives 127, may be different resin precursors. For example, one may include a phenolic resin, such as Resole or Novolac®, and the other comprising a silica or metal oxide sol-gel solution. These separate matrix precursors may be added sequentially to the density regulating portions 110 in block 322, so as to facilitate segregation of the catalysts 125, magnetic material 126, and functional additives 127, within the porous matrix 120 of the final composite material 100.

Where separate domains of porous matrix 120 is desired, such as those shown in FIG. 3B or 3F, similarly, separate batches of matrix precursor are to be mixed and added to density regulating portions 110 sequentially. The sequential addition of batches of matrix precursors may be directed to form patches of porous matrix on surfaces of the density regulating portions, causing build-up of separate domains.

Preparatory Procedures

The following preparatory procedures are provided as specific examples of the execution of method 300, or particular blocks therein, as the case may be, for the production of a composite material 100 or another composite material where made explicit or implied given the surrounding context.

Example 1

An example procedure for the synthesis of a catalyst 125 pursuant to block 302 of method 300, referred to herein as example 1, is discussed. Initially about 1.00 g of $TiO_2$ nanoparticles (Aeroxide, P25) are dispersed into about 232 mL of ethanol, followed by the addition of about 11.3 mL of about 1 mol/L $NH_3$ in ethanol. This solution is heated to about 45° C., and then about 6.25 mL of about 1 mol/L titanium(IV) butoxide solution in ethanol is added dropwise over the course of about 1 h. The reaction is stirred at about 45° C. for an additional about 24 h, and a precipitate is recovered by centrifugation, and washed thrice with ethanol, and then dried. This product is then added to a solution of about 0.113 g of urea in about 30 mL ethanol, stirred for about 6 h, then evaporated to dryness. This product is then ground to a powder, and treated at about 500° C. in a tube furnace for about 3 h under about 100 mL/min of either Ar, or about 5% $H_2$ in Ar.

Example 2

An example procedure for the synthesis of a catalyst 125 pursuant to block 302 of method 300, referred to herein as example 2, is discussed. Initially about 2.00 g of $TiO_2$ nanoparticles (Aeroxide, P25) are dispersed into a solution of about 62.0 mg of melamine in about 80.0 mL ethanol, stirred for about 24 h, then evaporated to dryness. This product is then ground to a powder, and treated at about 550° C. in a tube furnace for about 3 h under about 100 mL/min of $N_2$.

Example 3

An example procedure for the synthesis of a catalyst 125 pursuant to block 302 of method 300, referred to herein as example 3, is discussed. Initially, about 31.8 mg of $AgNO_3$ and about 10.9 mg of NaCl are dissolved in about 400 mL of deionized water, and the pH is adjusted to about 11 with NaOH. About 2.00 g of $TiO_2$ nanoparticles (Aeroxide, P25) are then dispersed in this solution, after which the solution is purged of dissolved oxygen through fusing with $N_2$ in a sealed flask. About 27.0 mL of ethanol are then added to the solution, and the mixture is stirred for about 48 h under UV illumination (about 5 mW/cm$^2$) to photodeposit Ag on the surface of the $TiO_2$. After the reaction, the precipitate is recovered by centrifugation, and washed thrice with water, and then dried.

Example 4

An example procedure for the synthesis of a catalyst 125 pursuant to block 302 of method 300, referred to herein as example 4, is discussed. Initially, about 62.0 mg of $K_2PdCl_4$ is dissolved in about 400 mL of deionized water, and the pH is adjusted to about 12 with NaOH. About 2.00 g of $TiO_2$ nanoparticles (Aeroxide, P25) are then dispersed in this solution, after which the solution is purged of dissolved oxygen through flusing with $N_2$ in a sealed flask. About 27.0 mL of ethanol are then added to the solution, and the mixture is stirred for about 48 h under UV illumination (about 5 mW/cm$^2$) to photodeposit Pd on the surface of the $TiO_2$. After the reaction, the precipitate is recovered by centrifugation, and washed thrice with water, and then dried.

Example 5

An example procedure for the synthesis of a catalyst 125 pursuant to block 302 of method 300, referred to herein as example 5, is discussed. Initially, about 46.0 mg of $(NH_4)_2PtCl_6$ is dissolved in about 400 mL of deionized water, and the pH is adjusted to about 12 with NaOH. About 2.00 g of $TiO_2$ nanoparticles (Aeroxide, P25) are then dispersed in this solution, after which the solution is purged of dissolved oxygen through flusing with $N_2$ in a sealed flask. About 27.0 mL of ethanol are then added to the solution, and the mixture is stirred for about 48 h under UV illumination (about 5 mW/cm$^2$). After the reaction, the precipitate is recovered by centrifugation, and washed thrice with water, and then dried. This product is then ground to a powder, and treated at about 300° C. in a tube furnace for about 4 h under about 100 mL/min of about 5% $H_2$ in Ar.

Example 6

An example procedure for the preparation of a resol as a resin precursor pursuant to block 310 of method 300, referred to herein as example 6, is discussed. About 4.10 g phenol is melted at about 45° C., and then about 0.879 mL of about a 20% NaOH aqueous solution is added while stirring. About 6.49 mL of formalin (about 37% formaldehyde in $H_2O$) is then slowly added to the phenol solution at about 20 mL/h while stirring. The mixture is then heated at about 70-75° C. for about 1 h, then cooled to room temperature. The pH of the solution is then adjusted to about 7 with about 1 mol/L HCl, and water is removed from the solution by vacuum evaporation at about 50° C. This product is considered a phenolic resol, and is dissolved in ethanol to form about a 20 wt. % solution as a resin precursor.

Example 7

An example procedure for the preparation of a silica sol-gel solution as a resin precursor pursuant to block 310, referred to herein as example 7, is discussed. About 10.5 mL tetraethylorthosilicate (TEOS) is mixed with about 11.0 mL ethanol under vigorous stirring. About 46.0 μL of HCl (about 37%, ACS reagent grade) is separately mixed with about 10.1 mL deionized water, and then about 8.49 mL of this HCl solution is added to the TEOS solution in ethanol, and stirred for about 15 min. This mixture is then heated at about 60° C. for about 1 h, and then cooled to room temperature, to be used as a resin precursor.

Example 8

An example procedure for the preparation of a silica sol-gel solution as a resin precursor pursuant to block 310, referred to herein as example 8, is discussed. About 7.73 mL $H_2SO_4$ (about 95-98%, ACS reagent grade) is mixed with about 128 mL of water. About 15.3 g of $Na_2SiO_3$ is then dissolved in about 64.0 mL of water. This $Na_2SiO_3$ solution is then added into the $H_2SO_4$ solution and mixed, to be used as a resin precursor.

Example 9

An example procedure for performing blocks 310, 312, 314, 324 and 328 of method 300, referred to herein as example 9, is discussed. About 0.804 g of Pluronic® F127 as a pore templating agent, and about 0.925 g of dicyandiamide as a dopant, are dissolved in a solution of about 5.54 mL deionized water and about 13.8 mL of ethanol. While stirring about 4.63 g of about a 20% phenolic resol in ethanol (prepared according to example 6) is added to the solution as a resin precursor, and stirred for about 10 min. After forming a matrix precursor according to block 320, and adding the precursor to density regulating cores according to block 322, the mixture is evaporated to dryness for about 24 h at room temperature, followed by heating at about 100° C. for about 24 h to thermopolymerize the resol and allow the resin to set. The product is then transferred (without a wash block 326) to a tube furnace for calcination, and heated at about 1° C./min to about 350° C., then heated at about 350° C. for about 3 h, then heated at about 1° C./min to about 600° C., then heated at about 600° C. for about 2 h, then cooled to room temperature, all under about 100 mL/min $N_2$.

Example 10

Figure 18:
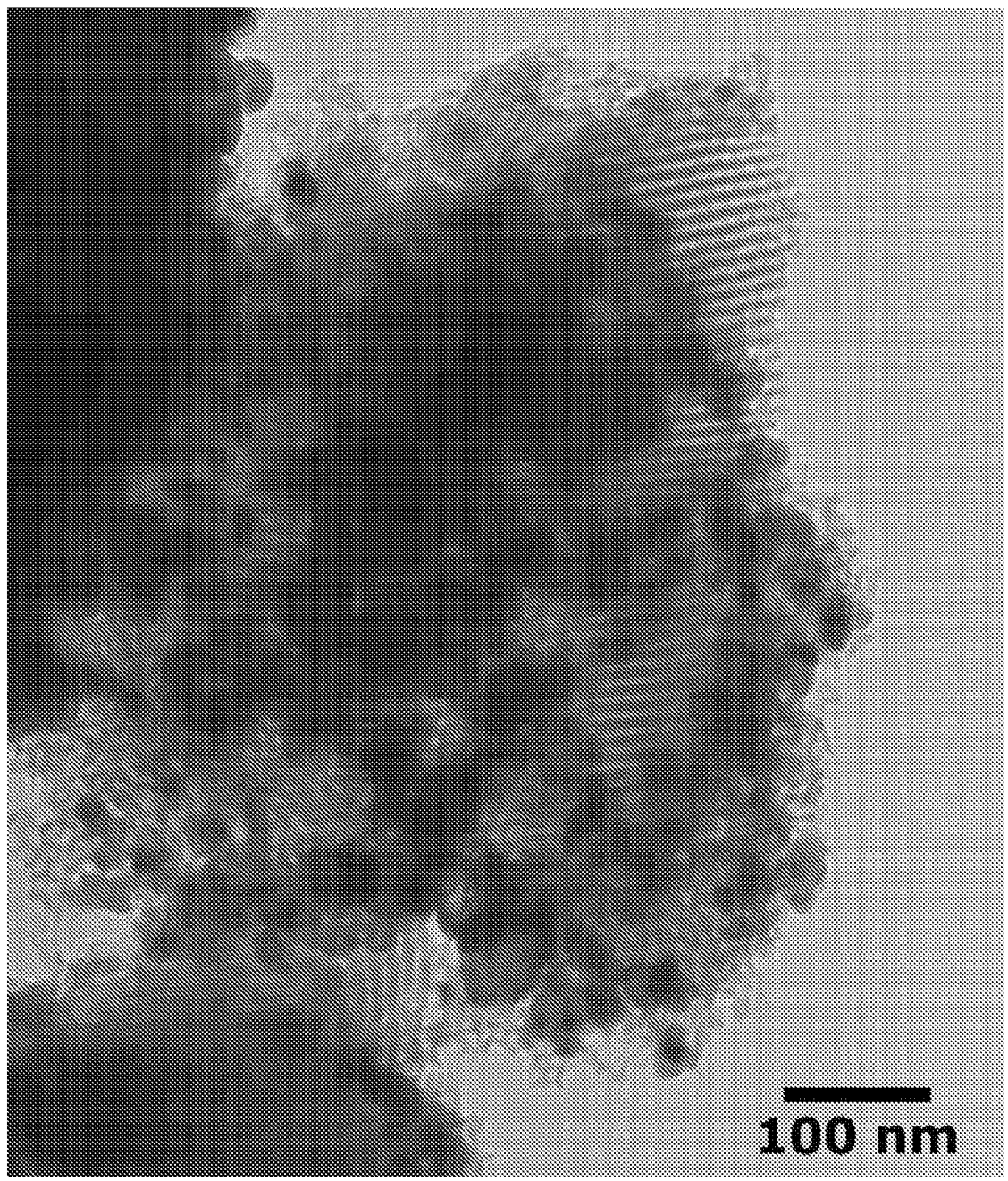
FIG. 18 is a transmission electron micrograph (TEM) of a catalyst dispersed throughout a porous matrix.

An example procedure for performing blocks 302, 310, 312, 324 and 328 of method 300, referred to herein as example 10, is discussed. About 0.809 g of Pluronic® F127 as a pore templating agent is dissolved in about 19.5 mL ethanol. This solution is then added to about 0.585 g of $TiO_2$ nanoparticles (Aeroxide, P25) as a photocatalyst, followed by about 0.195 mL of about 1 mol/L HCl, and stirred vigorously for about 10 min to mix, and then probe sonicated for about 20 min. This suspension is then mixed with about 4.36 g of about a 20% phenolic resol in ethanol (prepared according to example 6), and stirred for about 10 min. After forming a matrix precursor according to block 320, and adding the precursor to density regulating cores according to block 322, the mixture is evaporated to dryness for about 24 h at room temperature, followed by heating at about 100° C. for about 24 h to thermopolymerize the resol and allow the resin to set. The product is then transferred (without a wash block 326) to a tube furnace for calcination, and heated at about 1° C./min to about 350° C., then heated at about 350° C. for about 3 h, then heated at about 1° C./min to about 600° C., then heated at about 600° C. for about 2 h, then cooled to room temperature, all under about 100 mL/min $N_2$. A TEM micrograph of this product is shown in FIG. 18, demonstrating the formed structure of photocatalysts dispersed throughout a porous matrix.

Example 11

An example procedure for the synthesis of magnetic material 126, in the form of magnetic nanoparticles, pursuant to block 304 of method 300, referred to herein as example 11, is discussed. About 14.8 g $FeCl_3 \cdot 6 H_2O$ and about 10.1 g $FeSO_4 \cdot 7 H_2O$ are added to a sealed flask under $N_2$, followed by about 27.0 mL of deoxygenated ($N_2$ sparged) deionized water, and stirred for about 5 min to dissolve. The solution is then heated to about 70° C., and stirred vigorously for about 30 min, after which about 28.7 mL of $NH_4OH$ (ACS reagent, about 28-30% $NH_3$ basis) is rapidly added to the stirring solution. About 3.32 mL of an about 4 mol/L citric acid solution in water is then added to the flask while stirring. After reacting for about 1 h, the temperature of the solution is then raised to about 90° C., and $NH_3$ is eliminated under flowing $N_2$. The reaction is then cooled to room temperature, and the precipitate is recovered by magnetic separation, and washed thrice with water, thrice with ethanol, and then dried under $N_2$ or vacuum.

Example 12

An example procedure for performing blocks 304, 310, 312, 324 and 328 of method 300, referred to herein as example 12, is discussed. About 0.746 g of Pluronic® F127 as a pore templating agent is dissolved in a solution of about 5.99 mL deionized water and about 12.0 mL ethanol. This solution is then added to about 0.180 g of magnetic nanoparticles (prepared according to example 11), and stirred vigorously for about 10 min to mix, and then probe sonicated for about 20 min. This suspension is then mixed with about 5.81 g of about a 20% phenolic resol in ethanol (prepared according to example 6), and stirred for about 10 min. After forming a matrix precursor according to block 320, and adding the precursor to density regulating cores according to block 322, the mixture is evaporated to dryness for about 24 h at room temperature, followed by heating at about 100° C. for about 24 h to thermopolymerize the resol and allow the resin to set. The product is then transferred (without a wash block 326) to a tube furnace for calcination, and heated at about 1° C./min to about 350° C., then heated at about 350° C. for about 3 h, then heated at about 1° C./min to about 600° C., then heated at about 600° C. for about 2 h, then cooled to room temperature, all under about 100 mL/min $N_2$.

Example 13

An example procedure for performing blocks 310, 312, 322, 324 and 328 of method 300, referred to herein as example 13, is discussed. About 0.682 g of Pluronic® F127 as a pore templating agent is dissolved in about 7.77 mL ethanol. To this solution, about 3.92 g of about a 20% phenolic resol in ethanol (prepared according to example 6) is added as a resin precursor, and stirred for about 10 min. Separately, hollow glass microspheres (3M, iM30k) are rinsed once with about 1 mol/L $HNO_3$ at about 80° C. for about 1 h to neutralize surface alkalinity, and then washed thrice with water to remove residual acid, and then dried to a powder, to be provided as density regulating cores in the synthesis. About 4.00 mL of the above resol Pluronic® F127 solution is then added to about 1.00 g of the hollow glass microspheres, and mixed for about 10 min by sonication.

This mixture is then evaporated to dryness for about 24 h at room temperature, followed by heating at about 100° C. for about 24 h to thermopolymerize the resol and allow the resin to set. The product is deoxygenated under flowing $N_2$ for approximately about 12 h, and then transferred (without a wash block 326) to a tube furnace for calcination, and heated at about 1° C./min to about 350° C., then heated at about 350° C. for about 3 h, then heated at about 1° C./min to about 600° C., then heated at about 600° C. for about 2 h, then cooled to room temperature, all under about 100 mL/min $N_2$.

Example 14

Figure 19:
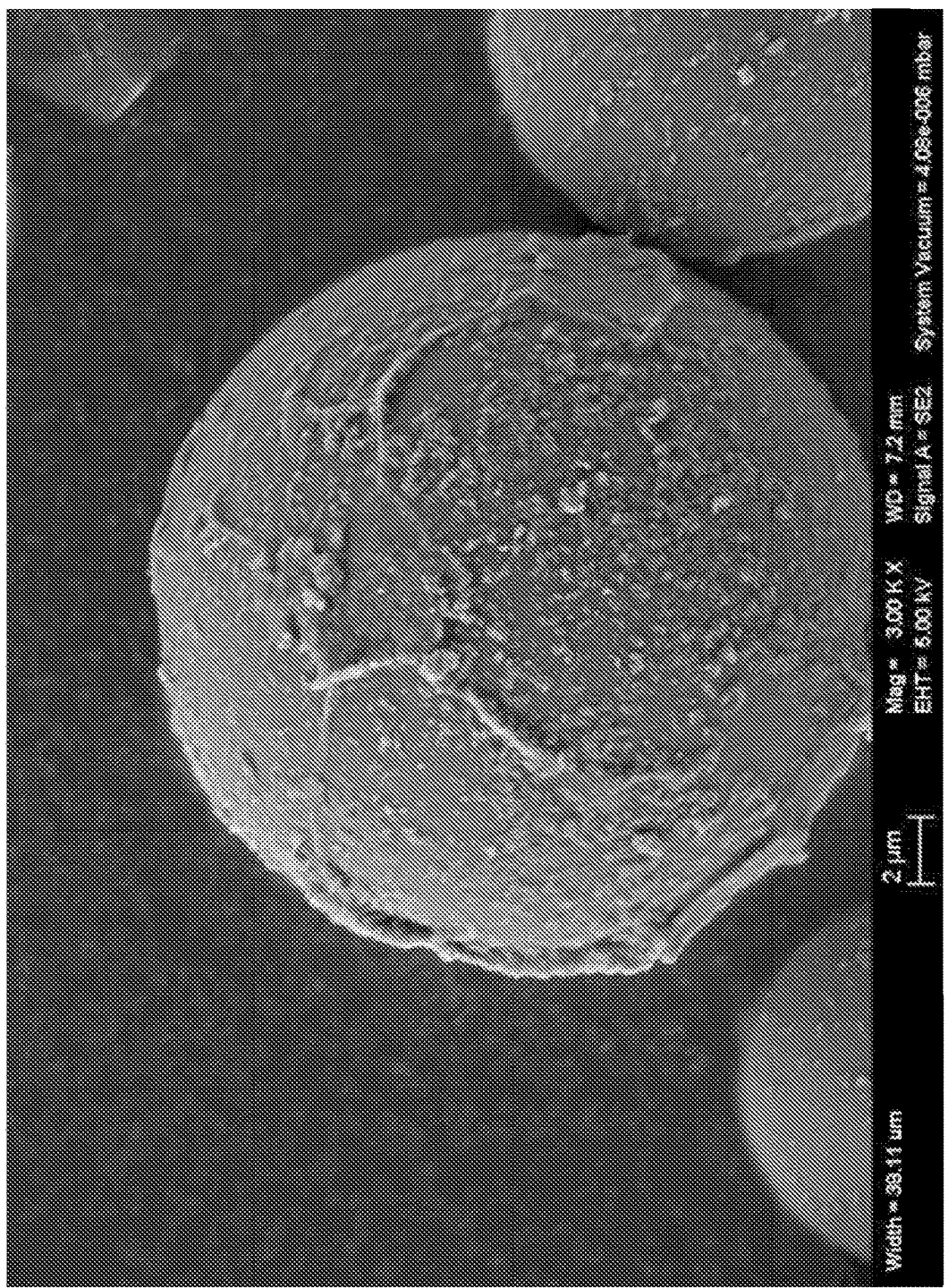
FIG. 19 is a scanning electron micrograph (SEM) of a porous matrix as a shell surrounding a hollow glass microsphere.

An example procedure for performing blocks 302, 310, 312, 320, 322, 324 and 326 of method 300, referred to herein as example 14, is discussed. About 0.250 g of $TiO_2$ nanoparticles (Aeroxide, P25) as a photocatalyst were added to a solution of about 0.702 mL of about 1 mol/L $HNO_3$ and about 0.420 g of Pluronic® F127 as a pore templating agent in about 6.32 mL deionized water, and mixed well. To this mixture, about 2.00 mL of a silica sol-gel solution as a resin precursor (prepared according to example 7) is added and mixed well, to form a matrix precursor. Separately, hollow glass microspheres (3M, iM30k) are rinsed once with about 1 mol/L $HNO_3$ at about 80° C. for about 1 h to neutralize surface alkalinity, and then washed thrice with water to remove residual acid, and then dried to a powder, to be provided as density regulating cores in the synthesis. About 2.00 mL of the above matrix precursor is added to about 1.00 g of the hollow glass microspheres, and mixed for about 10 min by sonication. This mixture is then evaporated to dryness for about 24 h at room temperature to allow the resin to set. The dried product is then added to about 10 mL of ethanol, and set to reflux while stirring for about 6 h, as a washing step to extract Pluronic® F127 from the matrix. The floating product is then separated from the ethanol as a water treatment composite material. An SEM micrograph of this product is shown in FIG. 19, demonstrating the formed structure of the matrix as a shell or coating on a hollow glass microsphere.

Example 15

An example procedure for performing blocks 302, 304, 306, 310, 312, 320, 322, 324, 328, 330, and 332 of method 300, referred to herein as example 15, is discussed. About 0.823 g of Pluronic® F127 as a pore templating agent is dissolved in a solution of about 6.61 mL deionized water and about 13.2 mL ethanol. To this solution is then added about 0.657 g of $TiO_2$ nanoparticles (Aeroxide, P25) as a photocatalyst, about 0.257 g of magnetic nanoparticles (prepared according to example 11) about 0.127 g of carbon nanotubes as a functional additive, and about 0.198 mL of about 1 mol/L $HNO_3$, which is then stirred vigorously for about 10 min to mix, and then probe sonicated for about 20 min. This suspension is then mixed with about 2.20 g of about a 20% phenolic resol in ethanol (prepared according to example 6) as a resin precursor, and stirred for about 10 min to form a matrix precursor. Separately, hollow glass microspheres (3M, iM30k) are rinsed once with about 1 mol/L $HNO_3$ at about 80° C. for about 1 h to neutralize surface alkalinity, and then washed thrice with water to remove residual acid, and then dried to a powder, to be provided as density regulating cores in the synthesis. About 10.0 mL of the above matrix precursor is added to about 1.00 g of the hollow glass microspheres, and mixed for about 10 min by sonication. This mixture is then evaporated to dryness for about 24 h at room temperature, followed by heating at about 100° C. for about 24 h to thermopolymerize the resol and allow the resin to set. The product is deoxygenated under flowing $N_2$ for about 12 h, and then transferred (without a wash block 326) to a tube furnace for calcination, and heated at about 1° C./min to 350° C., then heated at 350° C. for about 3 h, then heated at about 1° C./min to about 600° C., then heated at about 600° C. for about 2 h, all under about 100 mL/min $N_2$. The gas in the tube furnace is then changed from $N_2$ to about 100 mL/min $CO_2$, and the sample is heated at about 5° C./min to about 700° C., then heated at about 700° C. for about 1 h as an activation step. The gas in the tube furnace is then changed from $CO_2$ to about 10 mL/min $NH_3$, and the sample is heated at about 700° C. for about 3 h as a functionalization step. The sample is then cooled to room temperature under $N_2$ to yield a water treatment composite material.

Example 16

An example procedure for performing blocks 302, 304, 310, 320, 322, 324, and 326 of method 300, referred to herein as example 16, is discussed. About 3.6 g of of magnetic nanoparticles (prepared according to example 11) are added to about 300 mL of water, which is then stirred vigorously to mix, and then probe sonicated for about 20 min. Then about 8.54 g of $Na_2SiO_3$ is added to this dispersion, and stirred to dissolve. Separately, about 1.96 mL of $H_2SO_4$ (about 95-98%, ACS reagent grade) is added to about 150 mL of water. This $H_2SO_4$ solution is then slowly added to the magnetic particle $Na_2SiO_3$ solution with stirring, forming a resin precursor with the $Na_2SiO_3$, and together a matrix precursor with the magnetic particles. Separately, hollow glass microspheres (3M, iM30k) are rinsed once with about 1 mol/L $H_2SO_4$ for about 1 h to neutralize surface alkalinity, and then washed thoroughly with water to remove residual acid, and then dried to a powder, to be provided as density regulating portions in the synthesis. About 10.2 g of these hollow glass microspheres are then added as a powder to the matrix precursor solution with vigorous stirring. This mixture is then spray dried under $N_2$ at about 170° C. to allow the resin to set. Separately, about 4.5 g of $TiO_2$ nanoparticles (Aeroxide, P25) as a photocatalyst are then added to about 300 mL of water, which is then stirred vigorously to mix, and then probe sonicated for about 20 min. Then about 3.48 mL of $H_2SO_4$ (about 95-98%, ACS reagent grade) is added to this dispersion. Separately, about 6.88 g of $Na_2SiO_3$ is added to about 150 mL of water, and stirred to dissolve. This $Na_2SiO_3$ solution is then slowly added to the $TiO_2$ nanoparticle $H_2SO_4$ solution with stirring, forming a resin precursor with the $H_2SO_4$, and together a matrix precursor with the $TiO_2$. About 14.6 g of the product of the above spray drying step is then added as a powder to the matrix precursor solution with vigorous stirring. This mixture is then spray dried under $N_2$ at about 170° C. to allow the resin to set. The product is then washed thrice with water by floatation and magnetic separation to remove residual salts, and then dried under air, and powdered.

Example 17

An example procedure for performing blocks 302, 304, 310, 312, 320, 322, 324, 326, 328, and 330 of method 300, referred to herein as example 17, is discussed. About 6.08 g of Pluronic® F127 as a pore templating agent is dissolved in about 69.4 mL ethanol. To this solution is then added about 3.22 g of magnetic nanoparticles (prepared according to example 11), which is then stirred vigorously for about 10 min to mix, and then probe sonicated for about 20 min. This suspension is then mixed with about 28.5 g of about a 20% phenolic resol in ethanol (prepared according to example 6) as a resin precursor, and stirred for about 10 min to form a matrix precursor. Separately, hollow glass microspheres (3M, iM30k) are rinsed once with about 1 mol/L $H_2SO_4$ for about 1 h to neutralize surface alkalinity, and then washed thoroughly with water to remove residual acid, and then dried to a powder, to be provided as density regulating cores in the synthesis. The matrix precursor is then added to about 10 g of the hollow glass microspheres, and mixed well. This mixture is then evaporated to dryness for about 24 h at room temperature, followed by heating at about 100° C. for about 24 h to thermopolymerize the resol and allow the resin to set. The product is deoxygenated under flowing $N_2$ for about 12 h, and then transferred (without a wash block 326) to a tube furnace for calcination, and heated at about 1° C./min to 400° C., then heated at 400° C. for about 6 h, then heated at about 1° C./min to about 600° C., then heated at about 600° C. for about 2 h, all under about 100 mL/min $N_2$. The sample is then cooled to room temperature under $N_2$, and mixed with about 5.87 g of $NaNH_2$ powder in a mortar and pestle, and then this mixture is transferred to a tube furnace and heated at about 5° C./min to 600° C., then heated at 600° C. for about 1 h, all under about 100 mL/min $N_2$, as an activation step. The product is then washed thrice with water by flotation or magnetic separation to remove residual salts, and then dried under air, and powdered. Separately, about 4.50 g of $TiO_2$ nanoparticles (Aeroxide, P25) as a photocatalyst are then added to about 300 mL of water, which is then stirred vigorously to mix, and then probe sonicated for about 20 min. Then about 3.48 mL of $H_2SO_4$ (about 95-98%, ACS reagent grade) is added to this dispersion. Separately, about 6.88 g of $Na_2SiO_3$ is added to about 150 mL of water, and stirred to dissolve. This $Na_2SiO_3$ solution is then slowly added to the $TiO_2$ nanoparticle $H_2SO_4$ solution with stirring, forming a resin precursor with the $H_2SO_4$, and together a matrix precursor with the $TiO_2$. About 14.6 g of the washed powder product of the above activation step is then added as a powder to the matrix precursor solution with vigorous stirring. This mixture is then spray dried under $N_2$ at about 170° C. to allow the resin to set. The product is then washed thrice with water by flotation or magnetic separation to remove residual salts, and then dried under air, and powdered.

Example 18

An example procedure for performing blocks 302, 304, 310, 320, 322, 324, and 326 of method 300, referred to herein as example 18, is discussed. About 3.60 g of of magnetic nanoparticles (prepared according to example 11) are added to about 300 mL of water, which is then stirred vigorously to mix, and then probe sonicated for about 20 min. Then about 8.54 g of $Na_2SiO_3$ is added to this dispersion, and stirred to dissolve. Separately, about 1.96 mL of $H_2SO_4$ (about 95-98%, ACS reagent grade) is added to about 150 mL of water. This $H_2SO_4$ solution is then slowly added to the magnetic particle $Na_2SiO_3$ solution with stirring, forming a resin precursor with the $Na_2SiO_3$, and together a matrix precursor with the magnetic particles. Separately, hollow glass microspheres (3M, iM30k) are rinsed once with about 1 mol/L $H_2SO_4$ for about 1 h to neutralize surface alkalinity, and then washed thoroughly with water to remove residual acid, and then dried to a powder, to be provided as density regulating cores in the synthesis. About 10.2 g of these hollow glass microspheres are then added as a powder to the matrix precursor solution with vigorous stirring. This mixture is then spray dried under $N_2$ at about 170° C. to allow the resin to set. Separately, about 4.01 g of Pluronic® F127 as a pore templating agent is dissolved in about 45.8 mL ethanol. To this solution is then added about 17.5 g of about a 20% phenolic resol in ethanol (prepared according to example 6) as a resin precursor, and stirred for about 10 min to form a matrix precursor. The matrix precursor is then added to about 10 g of the product of the above spray drying step, and mixed well. This mixture is then evaporated to dryness for about 24 h at room temperature, followed by heating at about 100° C. for about 24 h to thermopolymerize the resol and allow the resin to set. The product is deoxygenated under flowing $N_2$ for about 12 h, and then transferred (without a wash block 326) to a tube furnace for calcination, and heated at about 1° C./min to 400° C., then heated at 400° C. for about 6 h, then heated at about 1° C./min to about 600° C., then heated at about 600° C. for about 2 h, all under about 100 mL/min $N_2$. The sample is then cooled to room temperature under $N_2$, and mixed with about 4.36 g of $NaNH_2$ powder in a mortar and pestle, and then this mixture is transferred to a tube furnace and heated at about 5° C./min to 600° C., then heated at 600° C. for about 1 h, all under about 100 mL/min $N_2$, as an activation step. The product is then washed thrice with water by flotation or magnetic separation to remove residual salts, and then dried under air, and powdered. Separately, about 4.5 g of $TiO_2$ nanoparticles (Aeroxide, P25) as a photocatalyst are then added to about 300 mL of water, which is then stirred vigorously to mix, and then probe sonicated for about 20 min. Then about 3.48 mL of $H_2SO_4$ (about 95-98%, ACS reagent grade) is added to this dispersion. Separately, about 6.88 g of $Na_2SiO_3$ is added to about 150 mL of water, and stirred to dissolve. This $Na_2SiO_3$ solution is then slowly added to the $TiO_2$ nanoparticle $H_2SO_4$ solution with stirring, forming a resin precursor with the $H_2SO_4$, and together a matrix precursor with the $TiO_2$. About 14.6 g of the washed powder product of the above activation step is then added as a powder to the matrix precursor solution with vigorous stirring. This mixture is then spray dried under $N_2$ at about 170° C. to allow the resin to set. The product is then washed thrice with water by flotation or magnetic separation to remove residual salts, and then dried under air, and powdered.

Methods for Water Treatment

Figure 8:
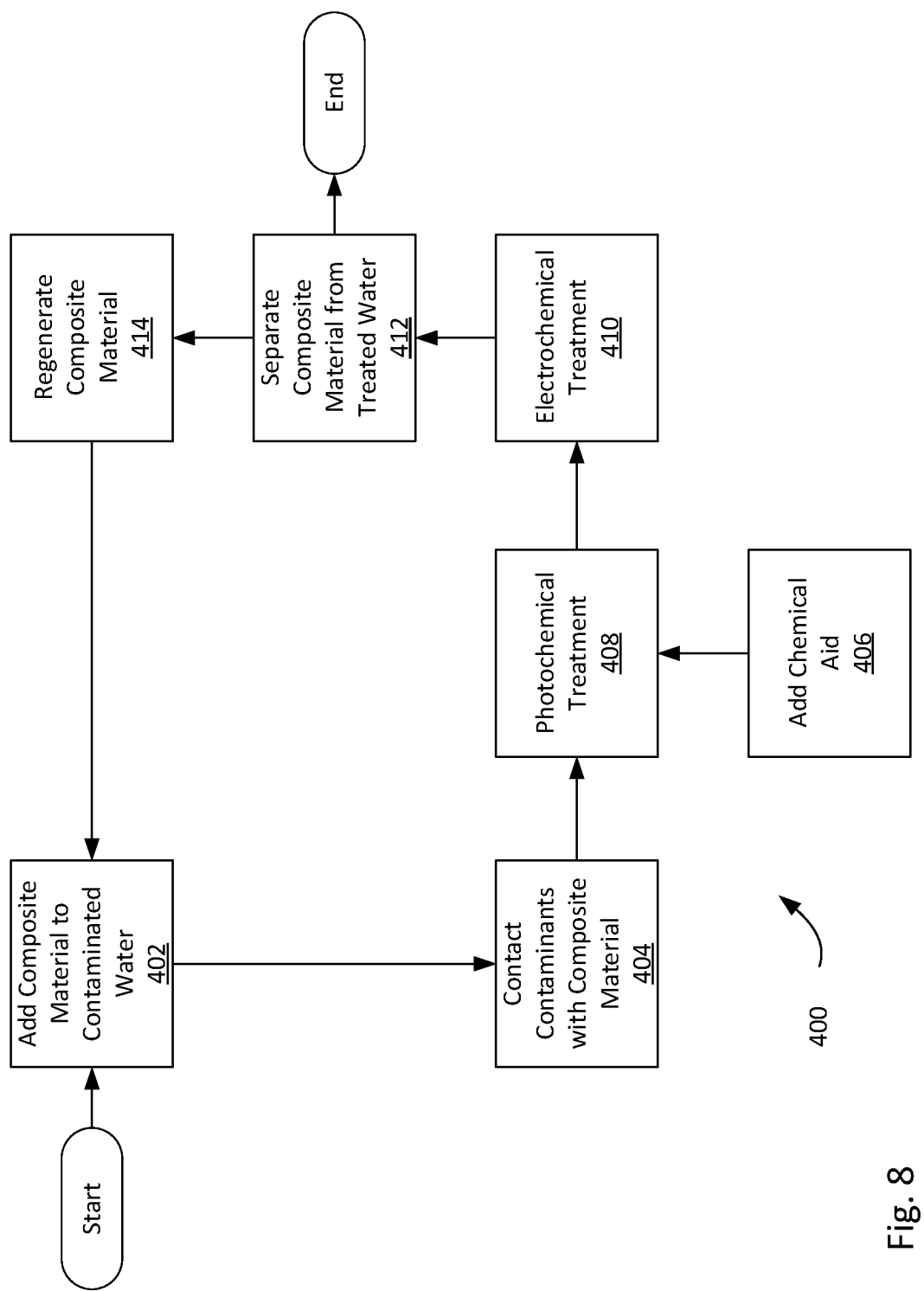
FIG. 8 is a flow chart depicting a method for treating water using a composite material.

Referring now to FIG. 8, a flow chart depicting a method 400 for treating water using a composite material is shown, according to a non-limiting embodiment. The method 400 is described as performed by a system discussed herein, but this is not limiting and the method 400 can alternatively be performed in other systems. For example, method 400 is described herein as being applicable to photocatalytic and electrocatalytic treatment of water. However, it is to be understood that certain blocks of the method 400 may be omitted, such as block 408 where there is no photocatalyst, or block 410 where there is no electrocatalyst. Further, it is to be emphasized that the blocks of method 400 need not be performed in the exact sequence as shown.

At block 402, a composite material 100 comprising density regulating portions 110 and a porous matrix 120, including a catalyst 125 and magnetic material 126, is added to contaminated water. It is to be understood that a variety of ways to add the composite material 100 to the contaminated water are contemplated in block 402.

For example, addition of the composite material 100 may include adding the composite material 100 to the contaminated water as a film, blanket, mesh, or fabric, adding the composite material 100 to the contaminated water as a set of platelets, injecting the composite material 100 to the contaminated water using gas as a carrier (e.g., bubbling), adding the composite material 100 as a dry powder at the air-water interface of the contaminated water, or any other means of contacting the composite material 100 with contaminated water.

At block 404, the water and the composite material 100 are then contacted together for a contact period to allow the composite material 100 to interact with contaminants in the water. The contacting may include mixing of the water and composite material 100, or may include flowing the water past the composite material 100, or allowing passive contact of the water and the composite material 100. In some embodiments, the composite material 100 is configured to adsorb contaminants from the water. In other embodiments, the contacting may include absorption. It is to be understood that a variety of contacting conditions are contemplated in block 404.

For example, the mixing provided in block 404 can be performed in the presence of ultrasonic irradiation to aid in the dispersion of the composite material 100 within the water.

As another example, the composite material 100 and contaminated water may be mixed together using a homogenizer, high-shear mixer, using the turbulent flow of the water, or any other means of mixing.

As another example, block 404 may involve pre-separation period where the composite material 100 is separated from a majority of the water before passing the composite material 100 to blocks 406 and 408. During this pre-separation period, contaminants from the water may be concentrated within the composite material 100 through adsorption, and thus only the composite material 100, or the composite material 100 with a fraction of the initial volume of water, may need to be passed to the subsequent blocks of the treatment process.

Furthermore, in general, block 404 may include a duration of mixing, whether passive or active, to allow for a period of contact time between the composite material 100 and the contaminated water, to allow the composite material to adsorb contaminants from the water, before proceeding to the next block. This contact period may last from seconds to days, depending on the specific contaminant requiring treatment, its concentration, and the importance of adsorption to facilitate the treatment process.

At block 406, chemical aids are added to the water containing the composite material 100 to aid in the subsequent treatment. It is to be understood that a variety of water treatment chemical aids are contemplated in block 406.

For example, the chemical aid provided in block 406 may include an oxidant, added to facilitate oxidative treatment of water contaminants in blocks 408 and 410. In a one embodiment, this oxidant is $H_2O_2$. In one embodiment, this oxidant is ozone.

As another example, the chemical aid provided in block 406 may include an electron donor added to the water to react with photogenerated holes in the composite material 100 during block 408, facilitating photocatalytic reduction treatment of water contaminants, such as heavy metals or selenium compounds. In one embodiment, this electron donor is an alcohol.

As other examples, the chemical aid provided may include perozone, chlorine, persulfate, ferrate, ethanol, formate or formic acid, acetate or acetic acid, a polyol, a mixture of oxidants, or any other chemical additive to facilitate the performance of the composite material 100 in water treatment.

At block 408, the water and the composite material 100 therein are exposed to light to allow a catalyst 125 to facilitate photochemical water treatment reactions. Generally, where a chemical reaction is facilitated, whether photocatalytic, electro catalytic, photoelectrocatalytic, or merely chemical, it is to be understood that the chemical reaction includes any reaction which degrades, reduces, oxidizes, or otherwise chemically modifies a contaminant in the water to render the contaminant inert, disposable, or otherwise treated or made susceptible to treatment in a water treatment process.

It is to be understood that a variety of light sources are contemplated in block 408. For example, the light provided in block 408 may include sunlight. In some embodiments, the sunlight exposure is enhanced by concentrating the composite material 100 at or near the surface of the contaminated water. In some of such embodiments, the buoyant property of buoyant density regulating cores 110-1 may allow the composite material 100 to float near the surface of the water.

As another example, the light provided in block 408 may includes light from an artificial light source. In some embodiments, this artificial light source provides UV light. In some of such embodiments, this UV light exposure is performed by flowing the water containing the composite material 100 and chemical aid(s) past a UV lamp, and for example, through a tube or pipe containing a UV lamp. In other embodiments, the light source may be conducted into the volume of water, such as through use of a light pipe, or fiber optic cables, for example. In some embodiments, the light provided may include an incandescent lamp, a fluorescent lamp, a light emitting diode (LED), a lazer, or any light source capable of initiating photochemical water treatment reactions in the system containing the composite material 100.

It is also to be understood that block 408 may involve flowing the composite material 100 and water through one or more photochemical reactors.

At block 410, an electrochemical oxidation process takes place in the system of water, composite material 100, and chemical aids, wherein the composite material 100 is an electrode or electrocatalyst. It is to be understood that a variety of electrochemical oxidation process are contemplated in block 410 wherein an electrochemical reaction is facilitated by catalyst 125.

For example, the electrochemical oxidation provided in block 410 may include passing the system of water, composite material 100, and chemical aid(s) between an anode and a cathode connected to a power supply, such as an electrochemical cell, utilizing the composite material 100 as a bipolar electrode or electrocatalyst for electrochemical water treatment reactions. In some embodiments, this electrochemical cell is operated to provide anodic oxidation of water contaminants.

A variety of configurations are contemplated for the electrochemical oxidation process provided in block 410. For example, anode materials may include carbon, graphite, graphene, carbon nanotubes, carbon aerogel, $RuO_2$-$TiO_2$ composite, $SnO_2$, $PbO_2$, boron-doped diamond (BDD), reduced or oxygen vacancy-doped $TiO_2$, or any other anode material capable of initiating electrochemical oxidation reactions in an electrochemical cell with applied voltage.

It is also to be understood that block 410 may involve flowing the composite material 100 and water through one or several electrochemical reactors. Furthermore, blocks 408 and 410 may be executed simultaneously in one or more photoelectrochemical reactors.

At block 412, the composite material is separated from the treated water. It is understood that several different separation processes may be applied alone or in combination in block 412.

For example, the separation of the composite material 100 from the treated water provided in block 412 may include gravimetric separation. In some embodiments, the composite material 100 may be floated to the surface of the water, utilizing the buoyant properties of the density regulating portions 110 of composite material 100, allowing the composite material 100 to be skimmed from the surface of the water. In other embodiments, the composite material 100 and treated water may be passed beneath a weir, causing the composite material 100 to be retained at the terminal end of the weir. In some embodiments, bubbling of air into the water, or dissolved air flotation (DAF), may be applied to accelerate the flotation process of the composite material 100.

As another example, the separation of the composite material 100 from the treated water may include magnetic separation. In some embodiments, a magnetic field gradient is applied in block 412, utilizing the magnetic properties of the magnetic material 126 of the composite material 100 to draw the composite material 100 out of, or to a designated portion of, the treated water, for collection. In some embodiments, the system containing the composite material 100 and treated water is flowed through a high-gradient magnetic separator (HGMS).

As another example, the separation of the composite material 100 from the treated water may include mechanical separation. In some embodiments, the system containing the composite material 100 and treated water is flowed through a sieve, filter, or membrane, retaining the composite material 100 on one side of the sieve, filter, or membrane, and passing the treated water to an outlet from the treatment system. In some embodiments, a centrifuging process may be applied to separate the composite material 100 from the water. In some embodiments, the mechanical separation involves size exclusion filtration based on the size of the composite material 100. Thus, where a catalyst 125 in the form of a nanoparticle is too small to be removed by a size exclusion filtration process, the composite material 100 with the catalyst 125 retained therein may be of a larger size more suitable for removal by size exclusion filtration.

As another example, the separation of the composite material 100 from the treated water may include coagulant separation. In some embodiments, the composite material 100 is aggregated through addition of a coagulant or flocculant to the water containing the composite material 100, to facilitate settling or separation of larger aggregates of the composite material 100. Further separation of the composite material 100 after coagulation or sedimentation may proceed by gravimetric, magnetic, or mechanical separation. In some embodiments, the added coagulant or flocculant includes a magnetic material to be used in the magnetic separation process.

Thus, it can be seen that any combination of gravimetric, magnetic, mechanical, coagulation, and filtration processes may be applied in block 412, simultaneously or in series, to enable separation of the composite material 100 from the treated water. After separation of the composite material 100, the method 300 may end, or the composite material 100 may be recycled, optionally including regeneration of the composite material 100 at block 412, for additional treatment cycles.

At block 414, the composite material 100 is regenerated for potential addition to a new volume of contaminated water to repeat a cycle. It is to be understood that a variety of regeneration processes are contemplated in block 414.

For example, regeneration provided in block 414 may include flushing water to remove the composite material 100 from a separation apparatus provided in block 412 (e.g., a filter, or HGMS), thereby creating a slurry of composite material 100 in water ready for potential addition to contaminated water, as in block 402. In some embodiments, this water provided for flushing is the same contaminated or treated water provided by this water treatment process.

As another example, the regeneration block 414 involves mechanically agitating the composite material 100 in water to remove bound fouling agents and thereby cleaning the composite material 100 to regenerate its activity for water treatment. In some embodiments, this mechanical agitation involves exposing the composite material 100 in water to ultrasonic radiation.

As another example, the regeneration block 414 involves washing the composite material 100 in a chemical solution to dissolve or desorb bound fouling agents and thereby cleaning the composite material 100 to regenerate its activity for water treatment. In some embodiments, this chemical washing involves rinsing the composite material 100 with acid, followed by water to remove the acid.

As other examples, the regeneration process applied to composite material 100 may include turbulently mixing the composite material 100 in water or a chemical solution, exposing the composite material 100 to UV light, ozone, or $UV/H_2O_2$ treatment, heating or calcining the composite material in an oven or furnace, washing the composite material in a surfactant solution, alkaline solution, oxidizing solution, or reducing solution, or applying any combination of mechanical and chemical regeneration processes, either simultaneously or in series, to clean the composite material 100 and regenerate its activity towards water treatment.

It is to be understood that, in some embodiments, the regeneration in block 414 may be performed occasionally, or at periodic intervals, and need not necessarily be performed at every cycle of the treatment process. In some embodiments, to determine when the regeneration in block 414 is to be performed, a sensing mechanism is employed, including an inline, autonomous system, or as an offline test, to test for the activity of composite material 100.

In some embodiments, the mixing activity in block 404, the addition of chemical aids in block 406, the electrochemical oxidation in block 410, and the regeneration in block 414 are considered to be optional steps and may be omitted. Such embodiments are applicable to passive water treatment systems, such as the one shown in FIG. 9 below. In general, other embodiments are contemplated including various combinations of these optional blocks.

Furthermore, the blocks of method 400 may be conducted out of the order described above. For example, the addition of chemical aids in block 406 may be performed prior to addition of the composite material in block 402, where chemical aids are added to the water before the composite material 100. As another example, the sequence of blocks 408 and 410 may be reversed, wherein the electrochemical oxidation reaction may occur before the photochemical water treatment reactions. As another example, blocks 408 and 410 may occur simultaneously.

Moreover, additional blocks may be added to the method 400 in some embodiments. For example, a slurry of composite material 100 in water may be formed before the composite material 100 in the slurry, is added to the contaminated water in block 402.

Systems for Water Treatment

Figure 9:
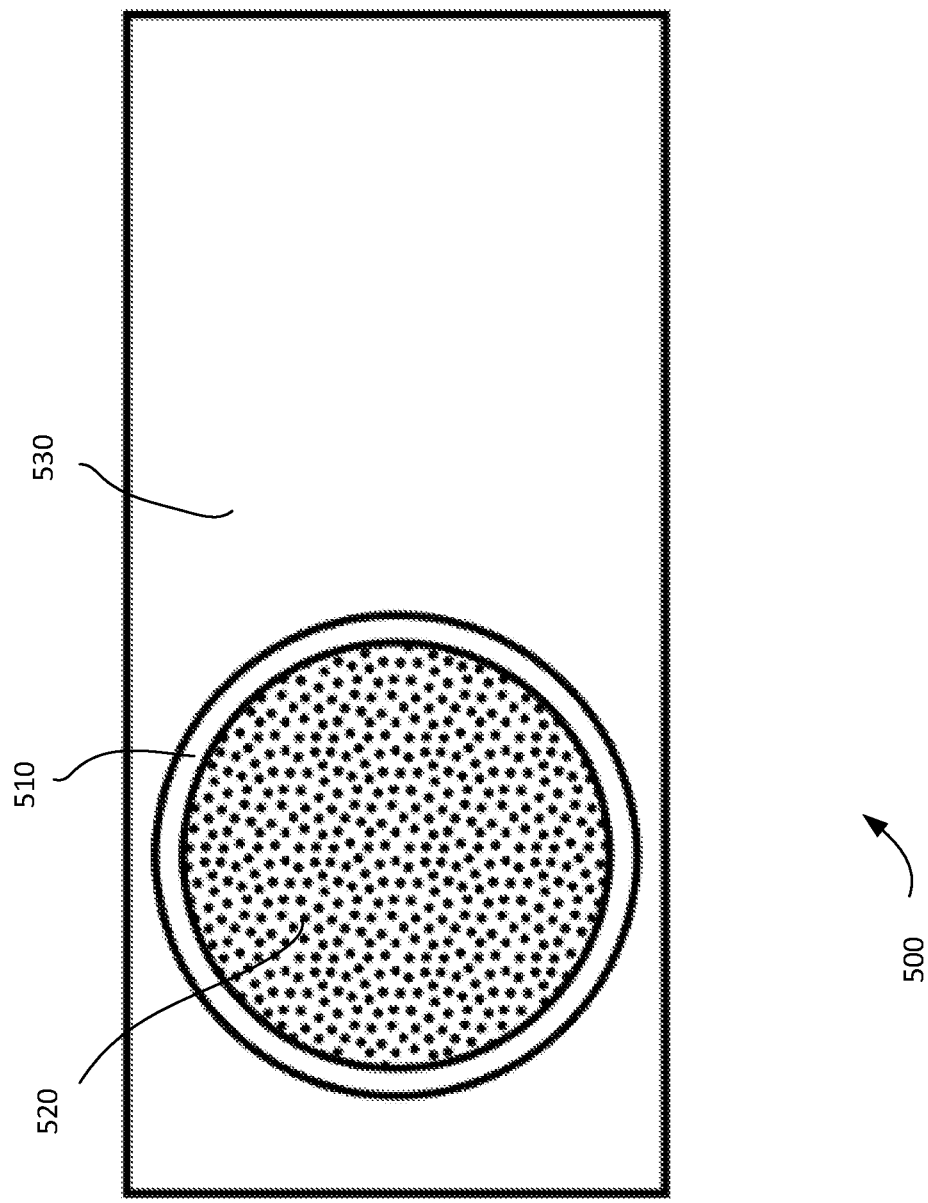
FIG. 9 is a schematic diagram of a passive water treatment system viewed from above.
Figure 10:
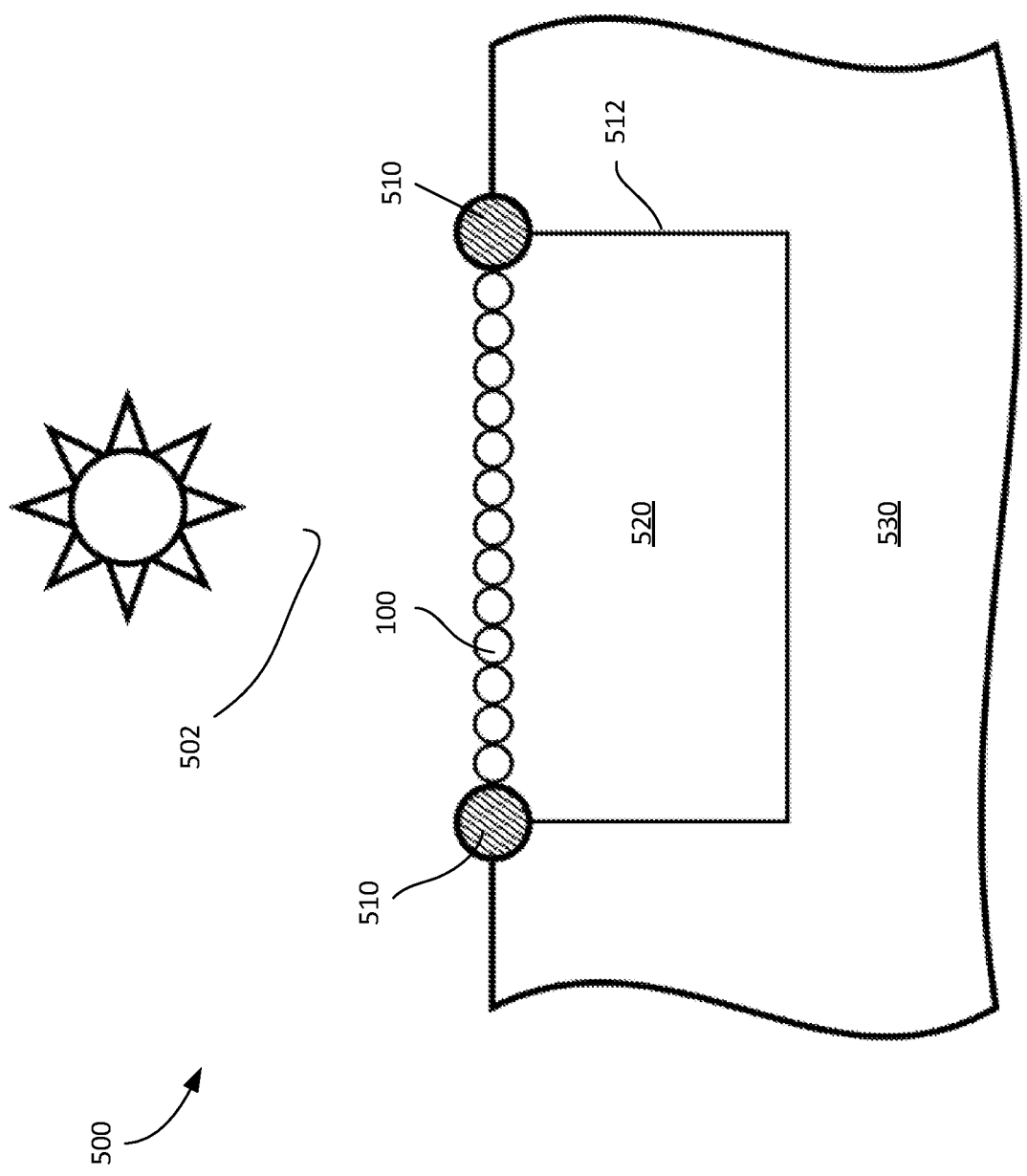
FIG. 10 is a schematic diagram of a cross-section of the water treatment system of FIG. 9.

Referring now to FIG. 9, a top-down schematic diagram of a passive water treatment system 500 is shown, according to a non-limiting embodiment. A side cross-section of the passive water treatment system 500 is shown in FIG. 10, according to a non-limiting embodiment.

The passive water treatment system 500 includes a containment boom 510 for segregating a portion of contaminated water 520 from a larger body of water 530, and for simultaneously containing composite material 100 within the segregated portion of water 520. In the present embodiment, the containment boom 510 is buoyant and forms a barrier at the air-water interfacial surface of the water 530, whereby the composite material 100 cannot pass over the barrier and is contained within the segregated water 520. The composite material 100 can thus be exposed to sunlight 502 from above, for initiating a photochemical reaction for treating the water as per block 408 in method 400, within the segregated portion of water 520. The containment boom 510 thus also serves as a means of separating the composite material 100 from treated water as per block 412 in method 400, since water may be exchanged within the segregated water 520 from the larger volume of water 530, while the composite material 100 cannot egress water 520.

Passive water treatment system 500 further includes enclosure 512, which is affixed to the containment boom 510. The enclosure 512 is provided as a mesh or sieve, to allow water to freely exchange been 520 and 530, but retain the composite material 100 within water 520 due to size exclusion filtration. In other embodiments, enclosure 512 may be provided as a non-water-permeable material, weighted so as to provide a containment volume for water 520 beneath the surface of the water, and including openings to allow for periodic exchange of water between water 520 and 530.

Composite material 100 is shown buoyantly floating near the air-water interfacial surface of the water 530, due to its inclusion of density regulating cores having a density less than that of water. The composite material 100 thus cannot pass over or under the containment boom 510 and cannot pass through enclosure 512 and is contained within the segregated water 520. Thus the containment boom 510 and enclosure 512 serve as a means of separating the composite material 100 from the treated water as per block 412 in method 400.

In passive water treatment system 500, no applied mixing energy is used, and the composite material 100 treats the water 520 in a passive capacity under sunlight 502 as per block 408 of method 400.

It is to be understood that system 500 may be provided in a body of water 530 with low flow and passive water exchange, such as a pond or lake, or in a body of water 530 with higher flow and active water exchange, such as a stream, river, or constructed channel.

Figure 11:
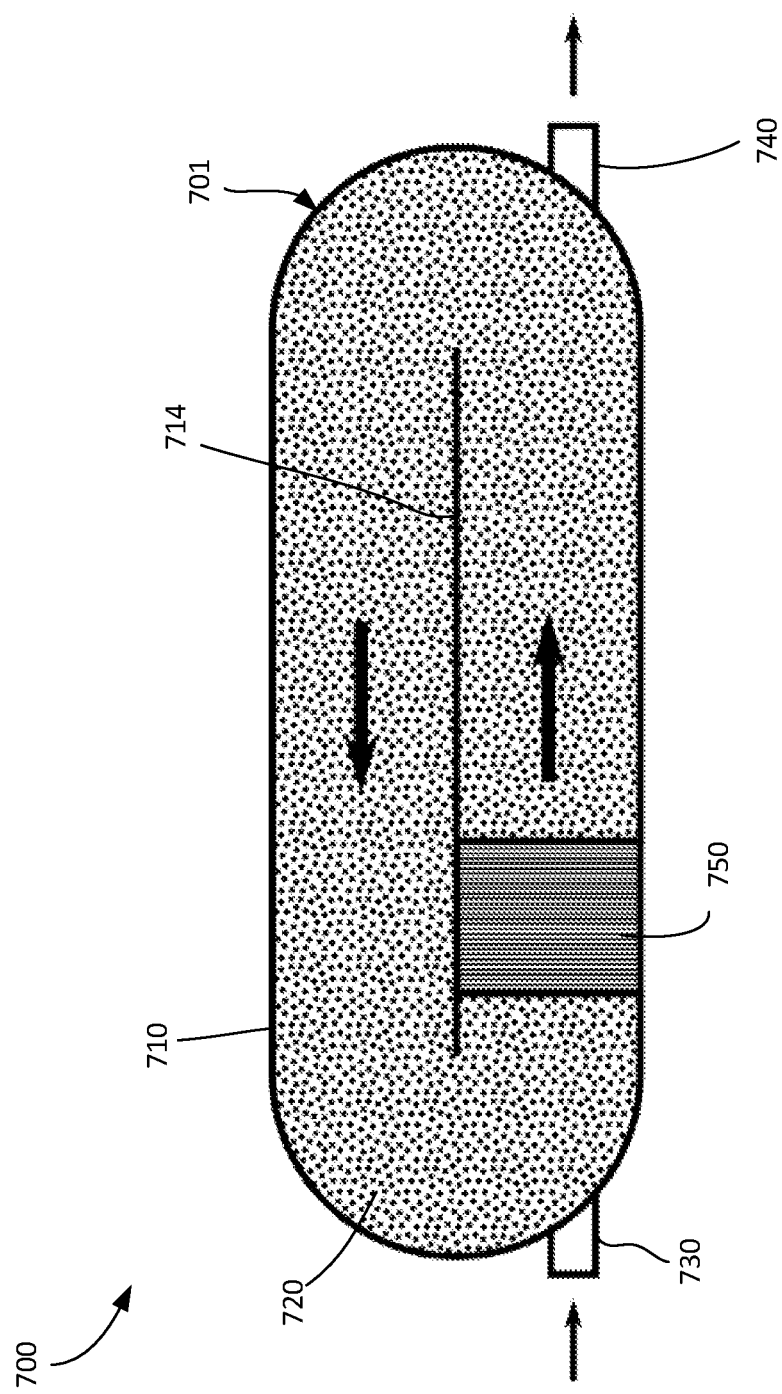
FIG. 11 is a schematic diagram of a raceway pool water treatment system viewed from above.
Figure 12:
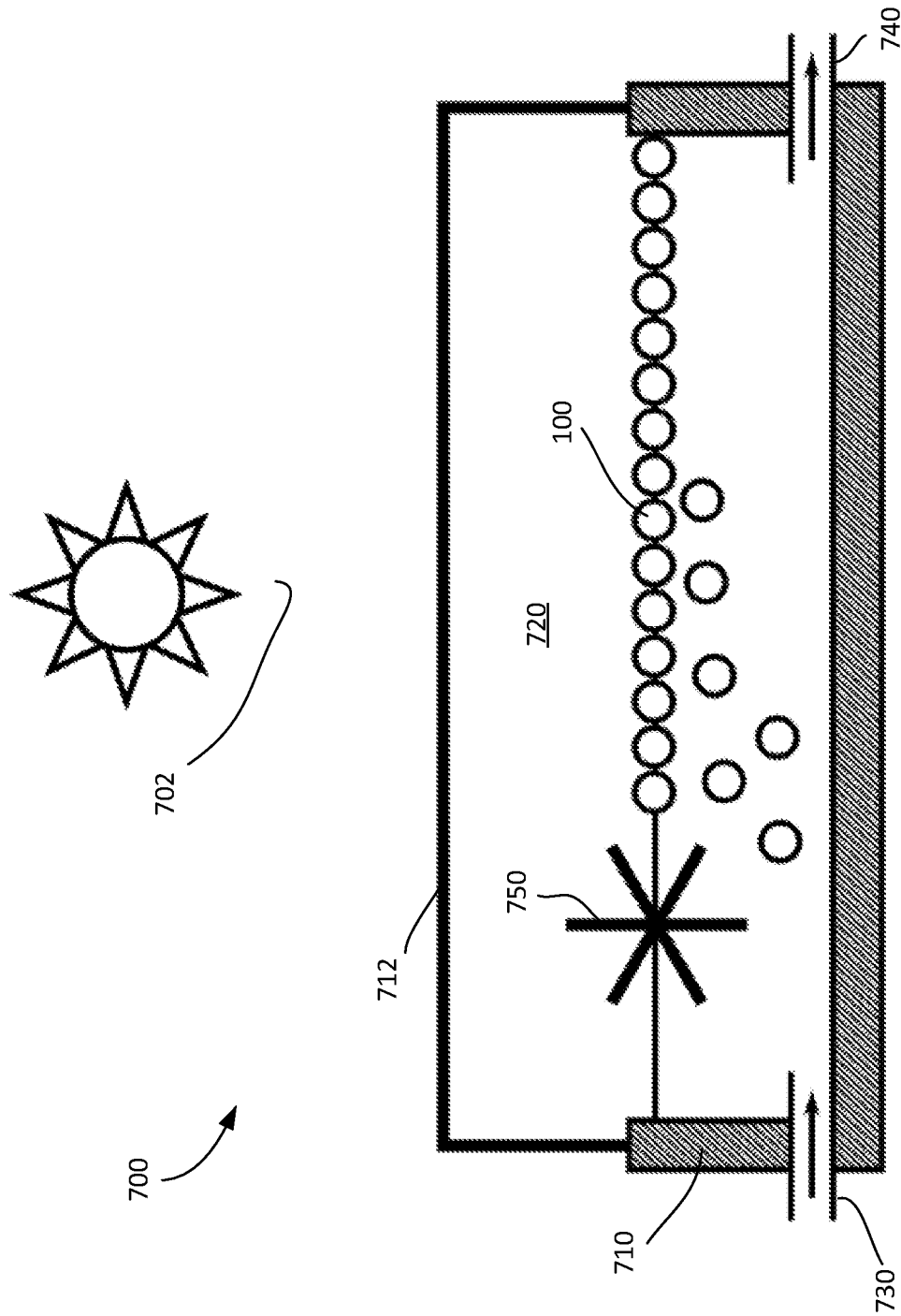
FIG. 12 is a schematic diagram of a cross-section of the water treatment system of FIG. 11.

Referring now to FIG. 11, a top-down view of a raceway water treatment system 700 is shown, according to a non-limiting embodiment. FIG. 12 is a cross-section view of the raceway water treatment system 700.

Raceway water treatment system 700 includes pool 701 having retaining walls 710 and central dividing wall 714 forming an enclosure in a raceway pool design. A mixture 720 of water requiring treatment and the composite material 100 is contained within pool 701. The composite material 100 is exposed to sunlight 702 from above, treating the water as per block 408 of method 400. System 700 includes an inlet 730 for receiving contaminated water requiring treatment into the pool, or a mixture of contaminated water and the composite material 100.

Raceway water treatment system 700 includes an outlet 740 o separate the composite material 100 as per block 412 in method 400, wherein water is allowed to flow through 740, but the composite material 100 is retained within pool 701. For example, a sieve or filter may be provided within 740, to allow water to freely pass through outlet 740 when the filter is open, but retain the composite material 100 within the pool 701 due to size exclusion filtration at outlet 740. In another embodiment, outlet 740 is provided to allow both water and the composite material to exit the pool 701, for separation in another system downstream.

Raceway water treatment system 700 includes a mixing device 750 for agitating the mixture 720 of water and composite material 100 during the treatment process. In the present embodiment, mixing device 750 is provided as a paddlewheel to flow water in a circuit around the pool 701.

In the present embodiment, raceway water treatment system 700 includes a roof 712 to enclosure enclose the pool 701, where the roof 712 may be formed from a material that is substantially transmissive to sunlight 702. In one embodiment, roof 712 is provided as a greenhouse constructed over the pool 701, where the greenhouse is constructed primarily of glass or light-transmissive plastic. In another embodiment, roof 712 is provided as a plastic film covering the surface of the pool 701.

Figures 13A, 13B:
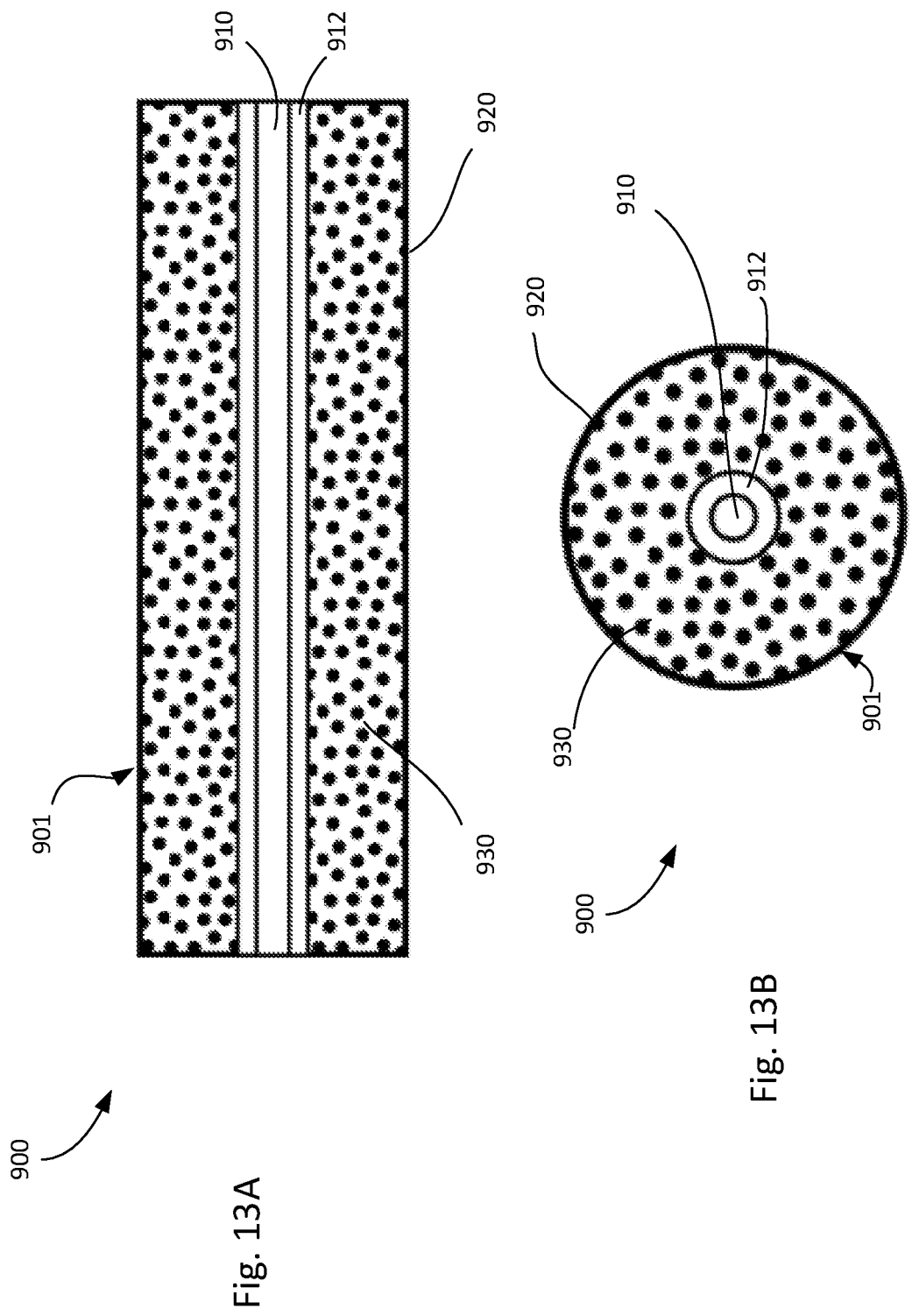
FIG. 13A is a schematic diagram of a side cross-section of a flow-through annular photoreactor water treatment system.
FIG. 13B is a schematic diagram of an axial cross-section of the water treatment system of FIG. 13A.

Referring now to FIG. 13A, a schematic diagram of a side cross-section of a flow-through annular photoreactor water treatment system 900 is shown, according to a non-limiting embodiment. FIG. 13B shows an axial cross-section of system 900.

System 900 includes an artificial light source 910 contained within an enclosure 920, forming an annular photoreactor 901. Light source 910 is further contained within protective sleeve 912, wherein this sleeve is transparent to the light emitted by 910. A mixture 930 of composite material 100 in water is contained within 920 and flowed past light source 910 in the annular volume between sleeve 912 and enclosure 920. In this process, the composite material 100 in 930 treats the water in mixture 930 upon exposure to light from 910. Photochemical treatment may take place according to block 408 of method 400, described above. In some embodiments, light source 910 is a UV fluorescent lamp, and enclosure 920 is a tube, pipe, or conduit.

Referring now to FIG. 14A, a schematic diagram of a side cross-section of a flow-through array photoreactor water treatment system 1000 is shown, according to a non-limiting embodiment. FIG. 14B shows an axial cross-section of the system 1000.

System 1000 includes an array of artificial light sources 1010 contained within an enclosure 1020, forming a photoreactor 1001. Light sources 1010 are further contained each within protective sleeve 1012, wherein protective sleeve 1012 is transparent to the light emitted by 1010. A mixture 1030 of composite material 100 in water is contained within 1020, and flowed past the array of light sources 1010 within enclosure 1020. In this process, the composite material 100 in 1030 treats the water in mixture 1030 upon exposure to light from 1010. Photochemical treatment may take place according to block 408 of method 400, described above. In some embodiments, light sources 1010 include UV fluorescent lamps.

Figure 15:
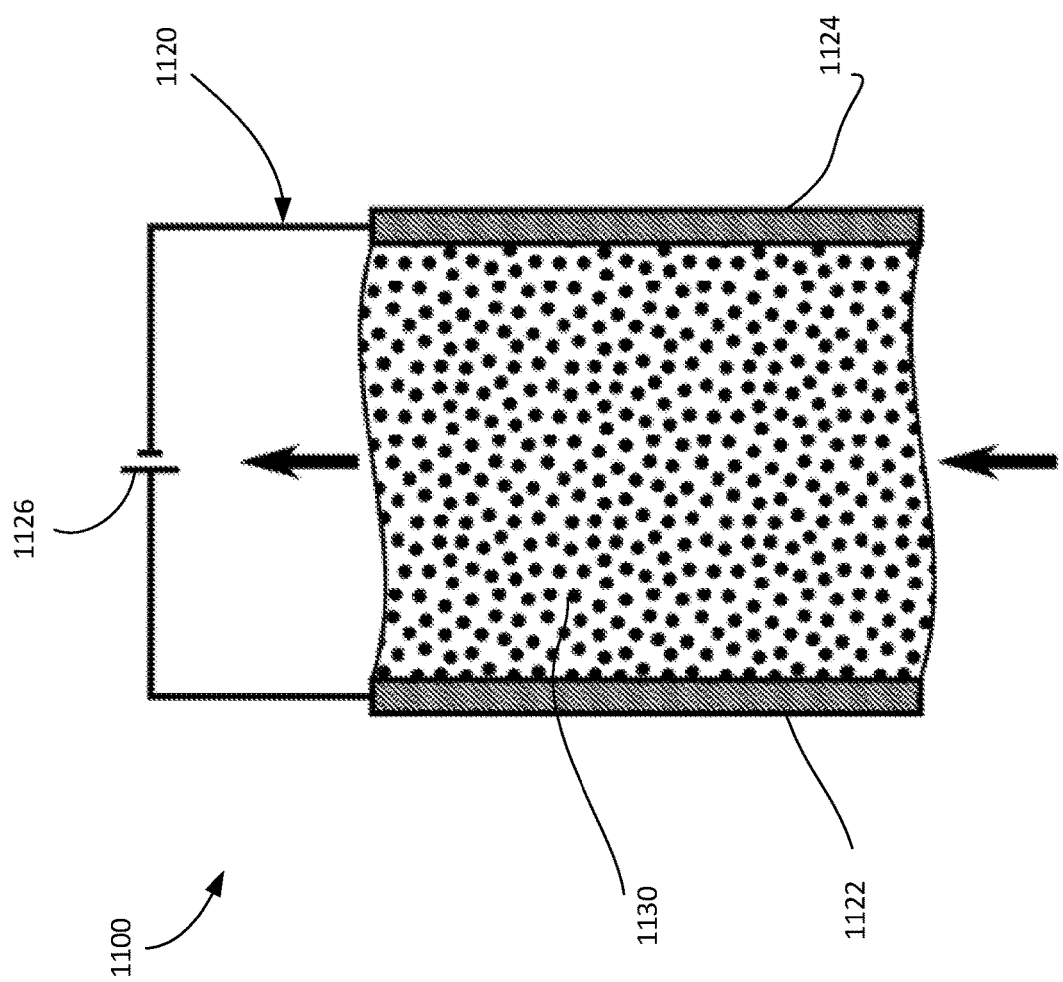
FIG. 15 is a schematic diagram of a cross-section a flow-through electrochemical cell water treatment system.

Referring now to FIG. 15, a schematic diagram of a side cross-section of a flow-through electrochemical cell water treatment system 1100 is shown, according to a non-limiting embodiment. System 1100 includes an electrochemical cell 1120 having an anode 1222 and cathode 1124. A mixture 1130 of composite material 100 in water is flowed through a channel between an anode 1122 and cathode 1124. Cell 1120 may be formed from a single channel between anode 1122 and cathode 1124, or include an array of channels formed through a plurality of electrode pairs 1122 and 1144. Anode 1122 and cathode 1124 are connected to a DC power supply 1126, which is used to apply a voltage between 1122 and 1124 to initiate electrochemical treatment processes in mixture 1130. Electrochemical treatment may take place according to block 410 of method 400, described above.

When flowed between 1122 and 1124, the composite material 100 in mixture 1130 functions as a bipolar electrode or electrocatalyst for electrochemical water treatment reactions. In one embodiment, the spacing between 1122 and 1124 is less than about 5 cm.

Furthermore, additional oxidation reactions at 1122 may contribute to the degradation of contaminants in mixture 1130, or contribute oxidative chemical species to aid in the degradation of contaminants in mixture 1130. Similarly, additional reduction reactions at 1124 may contribute to the degradation of contaminants in mixture 1130, or contribute reductive chemical species to aid in the degradation of contaminants in mixture 1130.

A variety of materials are contemplated to serve as the anode 1122. For example, anode materials may include carbon, graphite, graphene, carbon nanotubes, carbon aerogel, $RuO_2$-$TiO_2$ composite, $SnO_2$, $PbO_2$, boron-doped diamond (BDD), or any other anode material capable of initiating electrochemical oxidation reactions in an electrochemical cell with applied voltage.

Figures 16A, 16B:
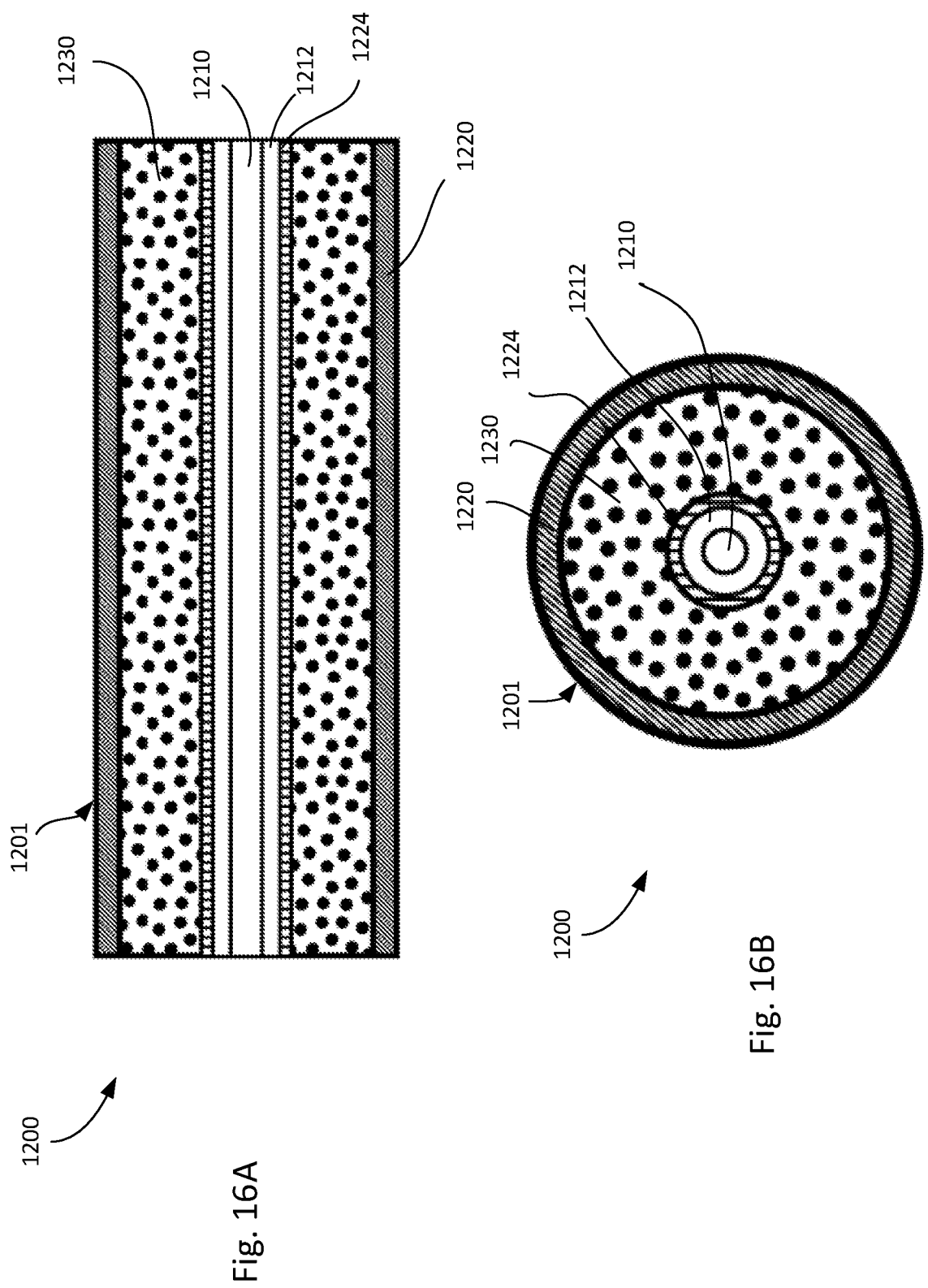
FIG. 16A is a schematic diagram of a side cross-section of a flow-through annular photoelectrochemical reactor water treatment system.
FIG. 16B is a schematic diagram of an axial cross-section of the water treatment system of FIG. 16A.

Referring now to FIG. 16A, a schematic diagram of a side cross-section of a flow-through annular photoelectrochemical reactor water treatment system 1200 is shown, according to a non-limiting embodiment. FIG. 16B shows an axial cross-section of the system 1200.

System 1200 includes an artificial light source 1210 contained within an enclosure 1220, forming an annular photoelectrochemical reactor 1201. In the present embodiment, light source 1210 is a UV fluorescent lamp, and enclosure 1220 is a tube, pipe, or conduit. Enclosure 1220 functions not only to enclosure a mixture 1230 of composite material 100 and water, but also as an anode.

Light source 1210 can be further contained within protective sleeve 1212, wherein this sleeve is transparent to the light emitted by 1210. Light source 1210 and protective sleeve 1212 are both contained within cathode 1224. Cathode 1224 at least partially allows light emitted by 1210 through to mixture 1230. In some embodiments, cathode 1224 is formed as mesh or grid sleeve on the outer surface of protective sleeve 1212 wherein light emitted by 1210 can be transmitted through the grid openings in cathode 1224.

A mixture 1230 of composite material 100 in water is contained within photoelectrochemical reactor 1201, and flowed past light source 1210 in the annular volume between cathode 1224 and enclosure 1220. In this process, the composite material 100 in 1230 treats the water in mixture 1230 upon exposure to light from 1210. Photochemical treatment may take place according to block 408 of method 400, described above. Enclosure 1220, acting as anode, and cathode 1224 form an electrochemical cell in the annular volume between them.

Enclosure 1220 and cathode 1224 are both connected to a DC power supply (not shown), which is used to apply a voltage between 1220 and 1224 to initiate electrochemical treatment processes in mixture 1230. Electrochemical treatment may take place according to block 410 of method 400, described above.

When flowed between 1220 and 1224, the composite material 100 in mixture 1230 functions as a bipolar electrode or electrocatalyst for electrochemical water treatment reactions.

In some embodiments, the spacing between 1220 and 1224 is less than about 5 cm.

Additional oxidation reactions at 1220 may contribute to the degradation of contaminants in mixture 1230, or contribute oxidative chemical species to aid in the degradation of contaminants in mixture 1230. Similarly, additional reduction reactions at 1224 may contribute to the degradation of contaminants in mixture 1230, or contribute reductive chemical species to aid in the degradation of contaminants in mixture 1230.

A variety of materials are contemplated to serve as the enclosure/anode 1220. For example, anode materials may include carbon, graphite, graphene, carbon nanotubes, carbon aerogel, $RuO_2$-$TiO_2$ composite, $SnO_2$, $PbO_2$, boron-doped diamond (BDD), reduced or oxygen vacancy-doped $TiO_2$, or any other anode material capable of initiating electrochemical oxidation reactions in an electrochemical cell with applied voltage.

Thus, in the photoelectrochemical reactor 1201 shown, water treatment including photochemical reactions in blocks 408 and electrochemical reactions in 410 of method 400 may occur simultaneously. However, it is to be understood that successive photochemical and electrochemical reactions are contemplated, in any order. Furthermore, it is to be understood that in some photoelectrochemical reactions, the photochemical or electrochemical portion of the reaction, as the case may be, may include a reaction step in the reaction mechanism.

Figure 17:
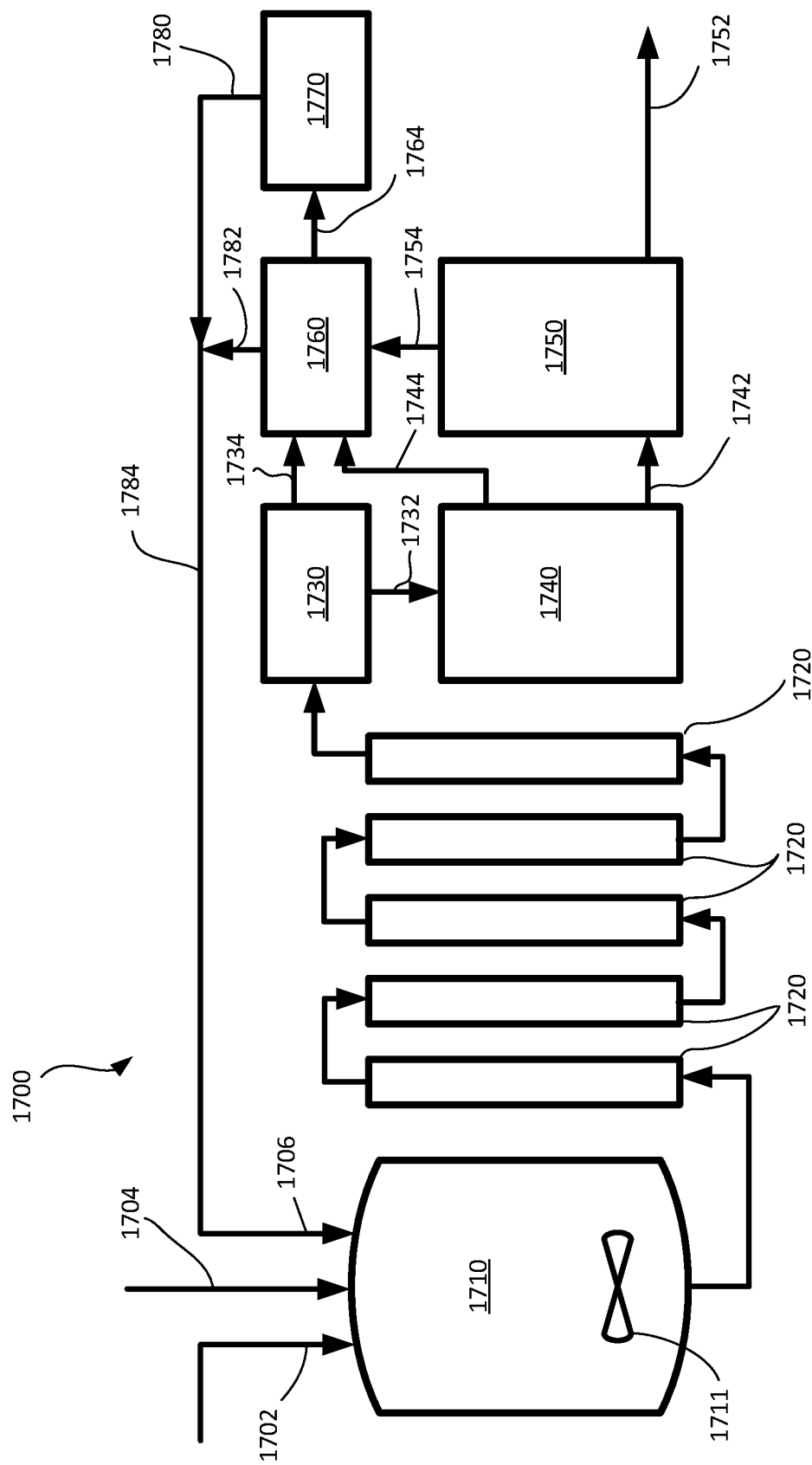
FIG. 17 is a schematic diagram of an water treatment and composite material recovery system.

FIG. 17 is a schematic diagram of a water treatment and composite material recovery system 1700, according to a non-limiting embodiment. System 1700 includes an equilibrium unit 1710, a series of reactors 1720, a magnetic separator 1730, a gravimetric separator 1740, a mechanical separator 1750, a composite material collector 1760, and a regeneration unit 1770. System 1700 is one example of a system in which a composite material 100, having a catalyst 125, may be used to treat contaminated water through photochemical degradation in an industrial setting.

The equilibrium unit 1710 in the present embodiment includes an equilibrium stage containment unit, and includes a contaminated water inlet 1702 providing a feed of contaminated water to be treated to the equilibrium unit 1710, a chemical aid inlet 1704 providing a feed of chemical aids to the contaminated water, and a recycle inlet 1706 for providing recycled composite material 100 from recovery line 1784, discussed below. The equilibration tank includes a mixing device 1711 for mixing the composite material 100 with the contaminated water.

The mixed water is fed into reactors 1720. In the present embodiment, the reactors 1720 in the present embodiment include flow-through photochemical reactors, such as those described in FIG. 13A, 13B, or 14A, 14B, aligned in series. Photochemical reactions take place as described in block 408 of method 400, described above. In other embodiments, reactors 1720 may include electrochemical cells such as those described in FIG. 15. Electrochemical reactions take place as described in block 410 of method 400, described above. In still other embodiments, reactors 1720 may include photoelectrochemical reactors such as those described in FIGS. 16A, 16B. The water is thus treated by the composite material 100 in the manner described in those figures and methods. In some embodiments, a single reactor 1720 is employed. In other embodiments, a plurality of reactors 1720 are employed in series or in parallel.

The treated water outputted from the series of reactors 1720 is fed into at least one of the separation units, including the magnetic separator 1730, gravimetric separator 1740, or mechanical separator 1750. In the present embodiment, the treated water is first fed into magnetic separator 1730, but it is understood that in other embodiments, the order of separation processes may differ, that some separation processes may take place simultaneously, and that some separation processes may be omitted.

The magnetic separator 1730 receives a feed of treated water from which composite material 100, containing magnetic material 126, is separated. Such a magnetic separation process may proceed in a manner described in block 412 of method 400, as described above.

The gravimetric separator 1740 receives a feed of magnetically separated water 1732 from which additional composite material 100, containing density regulating cores 110-1, is to be further separated. Such a gravimetric process may proceed in a manner described in block 412 of method 400, as described above.

The mechanical separator 1750 receives a feed of gravimetrically separated water 1742 from which additional composite material 100 is to be further separated. Such a mechanical process may proceed in a manner described in block 412 of method 400, as described above. The treated water, having had composite material 100 separated therefrom, is outputted in output line 1752.

The magnetic separator 1730, gravimetric separator 1740, and mechanical separator 1750 each includes a composite material recovery line 1734, 1744, and 1754, respectively, to provide separated composite material 100, in the form of a slurry, to composite material collector 1760, where further separation of composite material 100 may occur. Where it is determined that a portion of the recovered composite material 100 is not to be regenerated, the portion of the recovered composite material 100 may be fed by recycling line 1782 into main recycling line 1784 for re-use by equilibrium unit 1710. Where a portion of composite material 100 is to be regenerated, the portion of composite material 100 is fed by regeneration line 1764 into regeneration unit 1770, where regeneration of the composite material 100 may take place as described in block 414 of method 400, described above. Recycling line 1780 may then feed into main recycling line 1874 for feed into equilibrium unit 1710 to repeat a cycle of treatment.

It is emphasized that in other embodiments, system 1700 may include one or more equilibrium unit 1710, one or more reactor 1720, one or more separator 1730, 1740, 1750, one or more collector 1760, and one or more regeneration unit 1770. Generally, separator 1730, 1740, 1750, or any combination thereof, may be referred to as a separation unit.

Where chemical aids are added to the water to facilitate degradation of contaminants, a portion of the chemical aids may be consumed and converted to harmless residual byproducts, whether dissolved in, or vaporized from, and output with the treated water. In some embodiments, removal of chemical aids may be used by an additional separation process such as a scrubber at output line 1752.

Thus, it can be seen that the teachings provided herein are generally directed to water treatment. More particularly, the teachings herein are directed to a composite material for water treatment, and methods for use and production thereof. Through the use of photocatalysis or other catalytic processes, the composite materials as described herein may serve as an AOP for powerful treatment of a wide array of recalcitrant and persistent water pollutant in a manner applicable to the treatment of large volumes of water. Furthermore, density regulating and magnetic properties of the composite material provide ease of recovery and separation of the composite material by enabling the option and the dual operation of gravimetric and magnetic separation processes. The composite material thereby enhances recovery of the catalyst from treated water, mitigates unintentional release of catalyst particles into water, and improves mixability of the composite material in the water being treated. In some embodiments, the composite materials can be prepared in the form of a powder or slurry for water treatment, helping to overcome the mass transfer limitations of systems implementing immobilized photocatalysts or photocatalytic films.

The scope of the claims should not be limited by the embodiments set forth in the above examples, but should be given the broadest interpretation consistent with the description as a whole.

The invention claimed is:

1. A composite material for treating contaminated water when mixed with the contaminated water, the composite material comprising:
   a porous matrix comprising:
      a resin binder and including pore walls and pore channels:
      a photocatalyst comprising semiconducting nanocrystals, embedded within the resin binder, capable of facilitating a chemical reaction involving a contaminant of the contaminated water;
      a magnetic material embedded within the resin binder; and
   a density regulating portion to provide the composite material with an average density separably distinct from that of water.

2. The composite material of claim 1, wherein the density regulating portion causes the average density of the composite material to be sufficiently less than that of water for the composite material to be buoyant in water.

3. The composite material of claim 1, wherein the porous matrix comprises at least two domains, a first domain retaining the photocatalyst and a second domain retaining the magnetic material.

4. The composite material of claim 3, wherein the density regulating portion comprises a buoyant core, wherein the buoyant core is buoyant relative to water, and wherein the buoyant core is coated by the porous matrix.

5. The composite material of claim 4, wherein the porous matrix comprises a first layer and a second layer, the first layer retaining the magnetic material, the second layer retaining the photocatalyst, the first layer coating the buoyant core and the second layer coating the first layer.

6. The composite material of claim 4, wherein the porous matrix comprises a first layer, a second layer, and a third layer, the first layer retaining the magnetic material, the third layer retaining the photocatalyst, the second layer providing adsorption sites for the chemical reaction, the first layer coating the buoyant core, the second layer coating the first layer, and the third layer coating the second layer.

7. The composite material of claim 1, wherein the binder comprises one or more of:
   a mesoporous resin;
   a silica resin; and
   a carbon resin.

8. The composite material of claim 1, wherein the porous matrix further includes at least one
   functional additive retained by the resin binder for increasing adsorption of the contaminant, wherein the at least one functional additive is selected from the group consisting of: carbon nanotubes,
   semiconducting nanomaterials, graphene, reduced graphene oxide, graphene quantum dots, carbon nanodots, carbon nitride, graphitic carbon nitride, and dopants.

9. The composite material of claim 1, wherein the photocatalyst comprises a $TiO_2$ nanocrystal.

10. A system using a composite material for treatment of contaminated water, the system comprising:
    the composite material, including:
        a porous matrix comprising:
            a resin binder including pore walls and pore channels;
            a photocatalyst comprising semiconducting nanocrystals, embedded within the resin binder, capable of facilitating a chemical reaction involving a contaminant of the contaminated water;
            a magnetic material embedded within the resin binder; and
            a density regulating portion to provide the composite material with an average density separably distinct from that of water;
    an equilibrium unit configured to provide mixing of the composite material with the water;
    a reactor configured to provide light exposure to the photocatalyst of the composite material to facilitate the chemical reaction;
    a magnetic separator configured to separate the composite material from the water based on a magnetic property of the magnetic material of the composite material; and
    a gravimetric separator configured to separate the composite material from the water based on the average density of the composite material and the water.

11. The system of claim 10, wherein the system further comprises a regeneration unit configured to regenerate the composite material for recycling into the equilibrium unit.

12. The system of claim 10, further comprising a size-exclusion separator configured to separate the composite material from the water based on size of the composite material.

13. A method for treating contaminated water using a composite material comprising a porous matrix including: a resin binder with pore walls and pore channels, a photocatalyst comprising semiconducting nanocrystals embedded within the resin binder, a magnetic material embedded within the resin binder, and a density regulating portion to provide the composite material with an average density separably distinct from that of water, the method comprising:
    contacting water with the composite material;
    facilitating a photocatalytic chemical reaction involving the contaminant of the water; and
    separating the composite material from the water, the separating comprising at least one of:
        separating the composite material from the water based on a magnetic property of the magnetic material of the composite material; and
        separating the composite material from the water based on the average density of the composite material and the water.

14. The method of claim 13, further comprising, prior to separating the composite material from the water, floating the composite material to a surface of the water by a buoyant property of the composite material.

15. The method of claim 13, further comprising mixing a chemical aid with the water, the chemical aid comprising one of an oxidizing agent and a reducing agent.

16. A method for producing a composite material comprising a porous matrix including a resin binder with pore walls and pore channels, a photocatalyst comprising semiconducting nanocrystals embedded within the resin binder, a magnetic material embedded within the resin binder, and a density regulating portion to provide the composite material with an average density separably distinct from that of water, the method comprising:
    mixing the photocatalyst, the magnetic material, and a resin precursor to form a matrix precursor;
    coating the density regulating portion with the matrix precursor; and
    setting the matrix precursor to form the porous matrix having the photocatalyst and the magnetic material retained therein, and the density regulating portion disposed in the porous matrix.

17. The method of claim 16, wherein the matrix precursor comprises a plurality of batches, each batch comprising at most one of the photocatalyst and the magnetic material, and wherein mixing the density regulating portion with the matrix precursor comprises mixing the plurality of batches sequentially with the density regulating portion.

18. The method of claim 16, wherein:
    the matrix precursor comprises a first batch of matrix precursor retaining the magnetic material and a second batch of matrix precursors retaining the photocatalyst;
    mixing the density regulating portion with the matrix precursor comprises sequentially mixing the density regulating portion with the first batch of matrix precursor followed by the second batch of matrix precursor; and
    setting the matrix precursor comprises sequentially setting the first batch of matrix precursor after mixing therewith, followed by the second batch of matrix precursor after mixing therewith.

19. The method of claim 16, wherein:
    the matrix precursor comprises a first batch of matrix precursor containing the magnetic material, a second batch of matrix precursor, and a third batch of matrix precursors containing the photocatalyst:
    coating the density regulating portion with the matrix precursor comprises sequentially coating density regulating portions with the first batch of matrix precursor containing the magnetic material followed by the second batch of matrix precursor followed by the third batch of matrix precursor containing the photocatalyst; and
    setting the matrix precursor comprises sequentially setting the first batch of matrix precursor after coating therewith, followed by the second batch of matrix precursor after coating therewith, followed by the third batch of matrix precursor after coating therewith.

20. The method of claim 16, further comprising, prior to the mixing the density regulating portion with the matrix precursor, preparing the resin precursor, the preparing comprising:
   partially polymerizing a phenolic compound with formaldehyde in presence of one of an acid catalyst or a base catalyst to form a partially polymerized resin precursor;
   mixing a pore templating agent with the resin precursor; and
   mixing a functionalizing dopant with the resin precursor.

21. The method of claim 16, further comprising, prior to the mixing density regulating portion with the matrix precursor, preparing the photocatalyst, the preparing comprising:
   adsorbing a carbon-containing compound onto a surface of a
   semiconducting oxide nanomaterial; and
   annealing a shell of graphitic carbon on the semiconducting oxide.

22. The method of claim 16, further comprising, following the setting the matrix precursor:
   washing the resin to remove at least one of a pore templating agent and a reaction byproduct from the porous matrix; and
   following the washing the resin, calcining the resin.

23. The method of claim 22, further comprising, following the setting the matrix precursor, activating the resin to form micropores in the porous matrix.

24. The method of claim 16, further comprising functionalizing the porous matrix.

25. The method of claim 16, wherein mixing the photocatalyst, the magnetic material, and the resin precursor comprises mixing functional additives, wherein the functional additives comprise one or more of: carbon nanotubes, semiconducting nanomaterials, graphene, reduced graphene oxide, graphene quantum dots, carbon nanodots, carbon nitride, graphitic carbon nitride, and dopants.

26. The method of claim 16, wherein each of the photocatalyst, the magnetic material and the density regulation portion are provided as a powder or a slurry.

* * * * *

UNITED STATES PATENT AND TRADEMARK OFFICE
CERTIFICATE OF CORRECTION

| | |
|---|---|
| PATENT NO. | : 11,713,256 B2 |
| APPLICATION NO. | : 16/343298 |
| DATED | : August 1, 2023 |
| INVENTOR(S) | : Timothy Michael Carter Leshuk, Zachary William Young and Frank Gu |

It is certified that error appears in the above-identified patent and that said Letters Patent is hereby corrected as shown below:

In the Claims

Claim 1, Column 34, Line 35 reads:
"a resin binder and including pore walls and pore"
Should read:
-- a resin binder including pore walls and pore --

Signed and Sealed this
Tenth Day of October, 2023

*Katherine Kelly Vidal*

Katherine Kelly Vidal
*Director of the United States Patent and Trademark Office*